July 19, 1932.  A. BREDENBERG  1,867,803
MANUFACTURE OF BOOKS
Filed Sept. 15, 1927  13 Sheets-Sheet 6
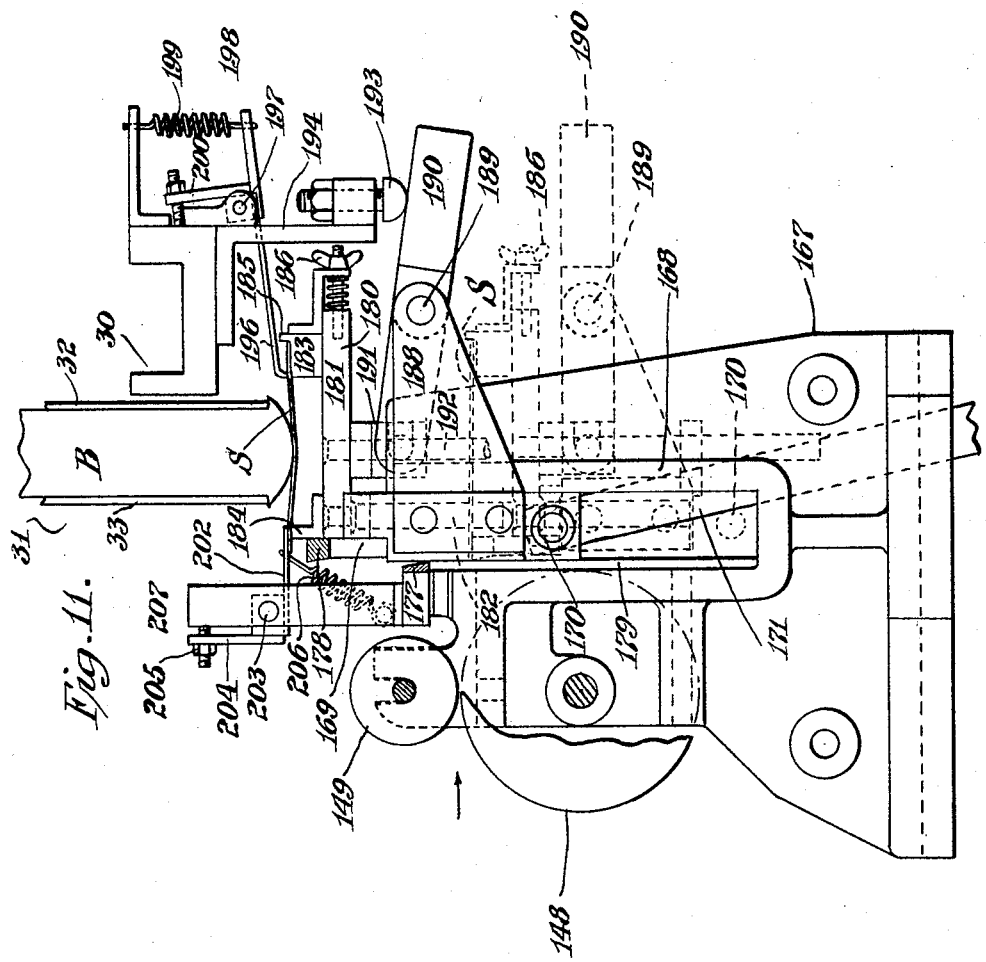
INVENTOR
Alfred Bredenberg,
BY
Rogers, Kennedy &
Campbell, ATTORNEYS.

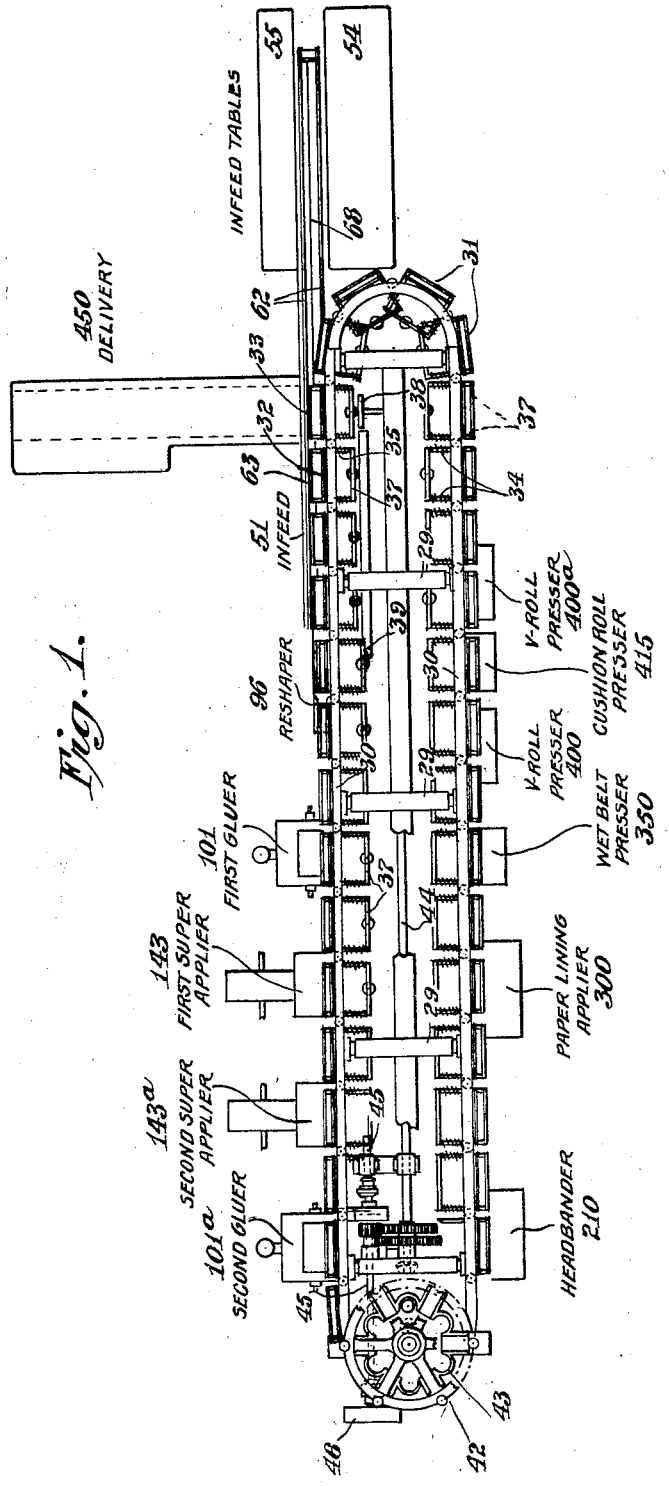

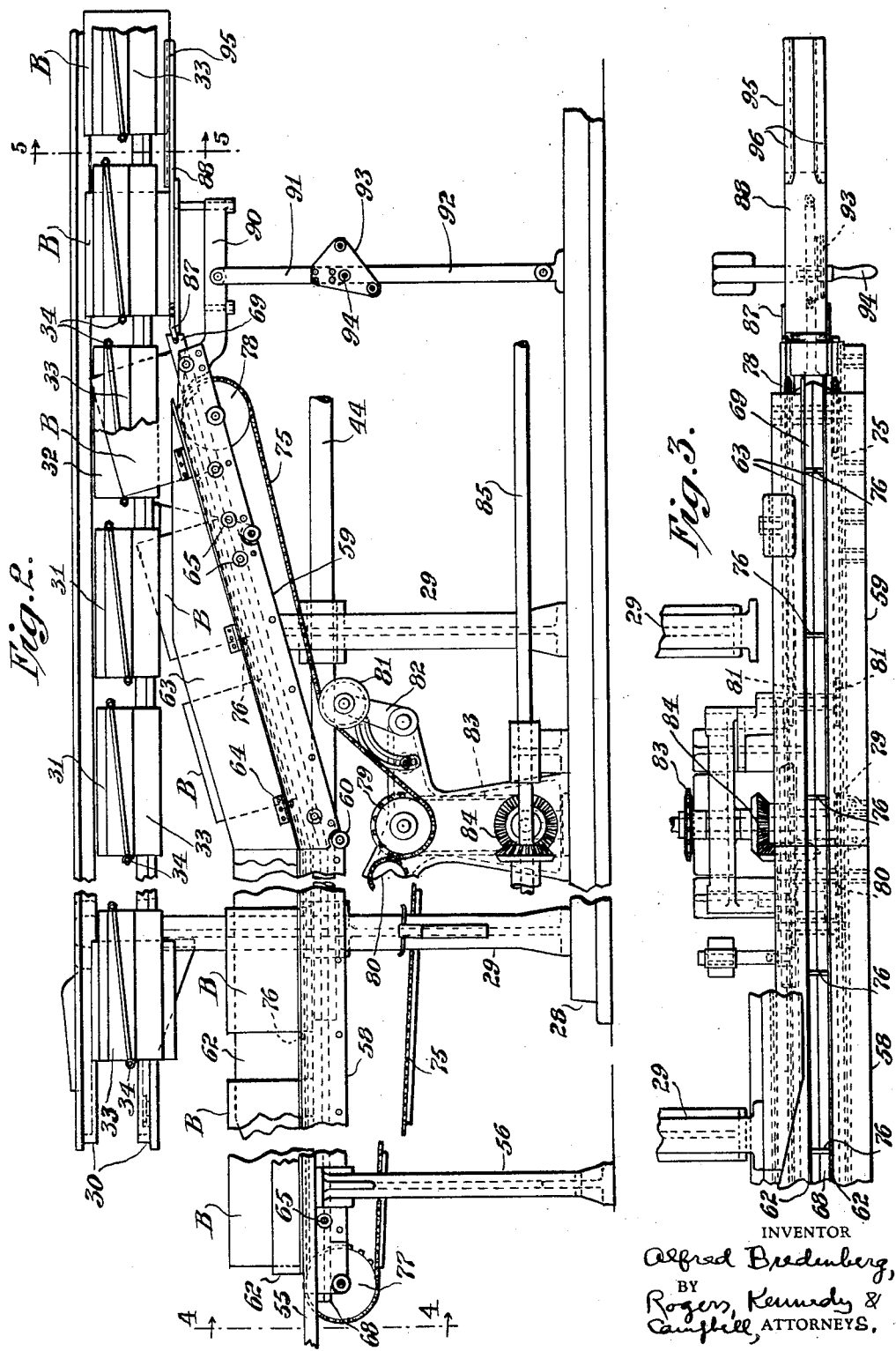

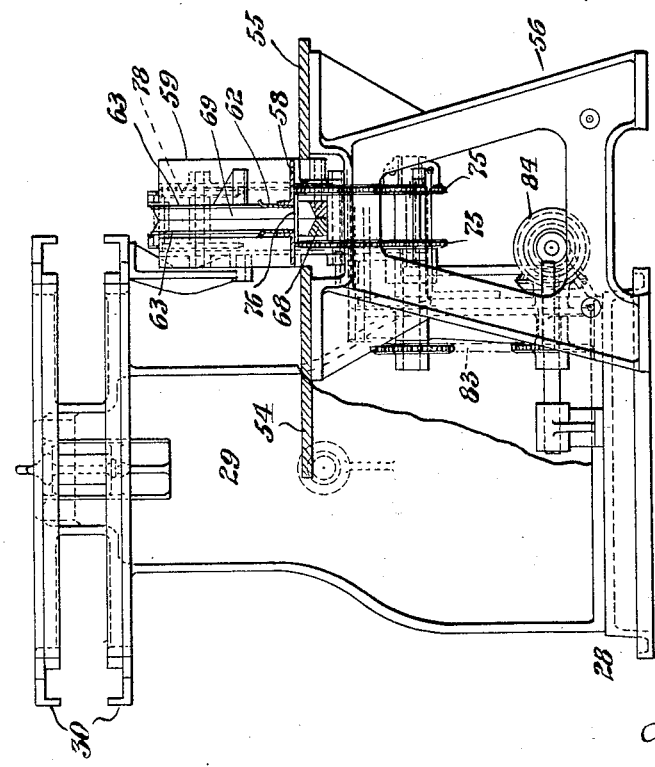

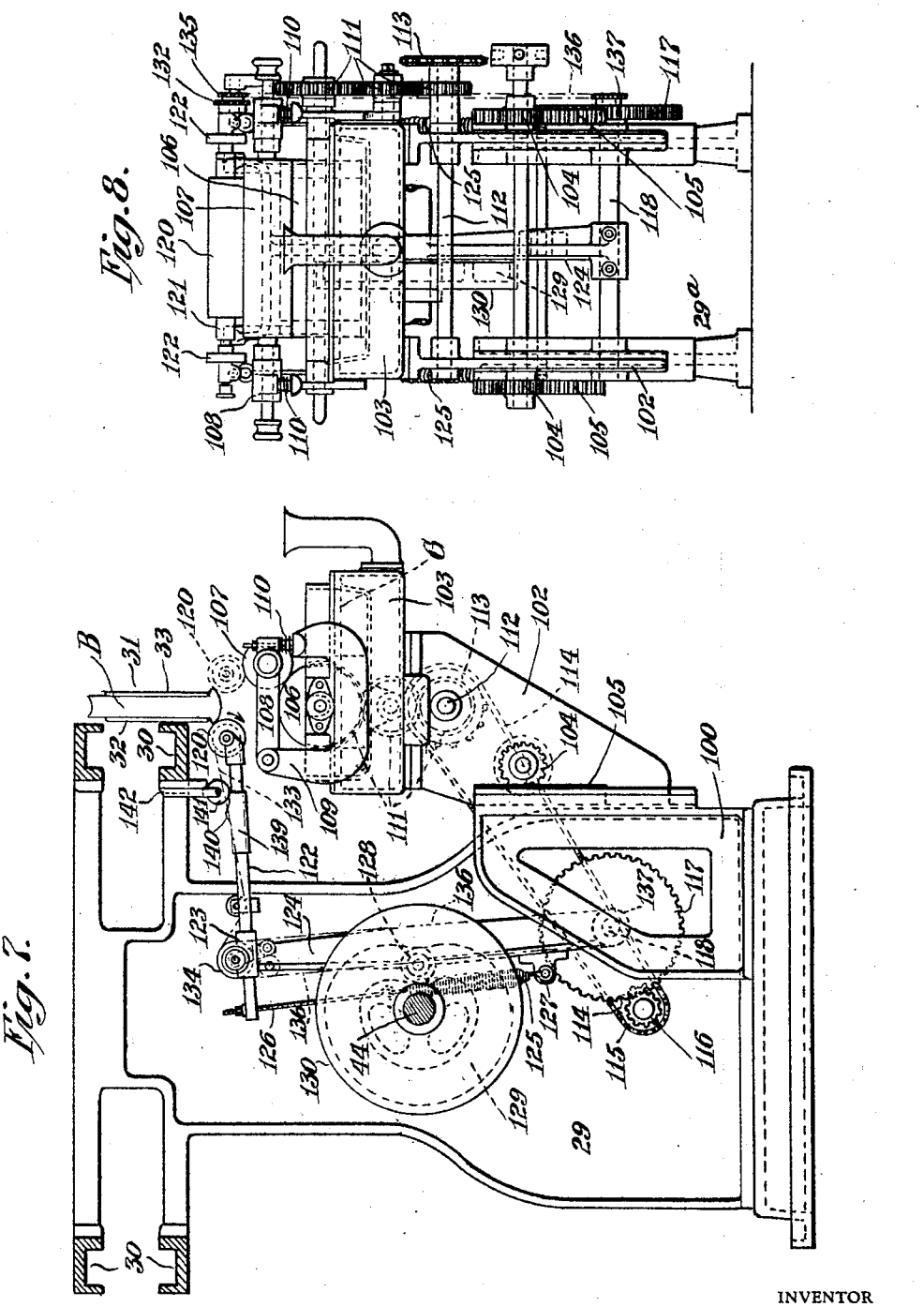

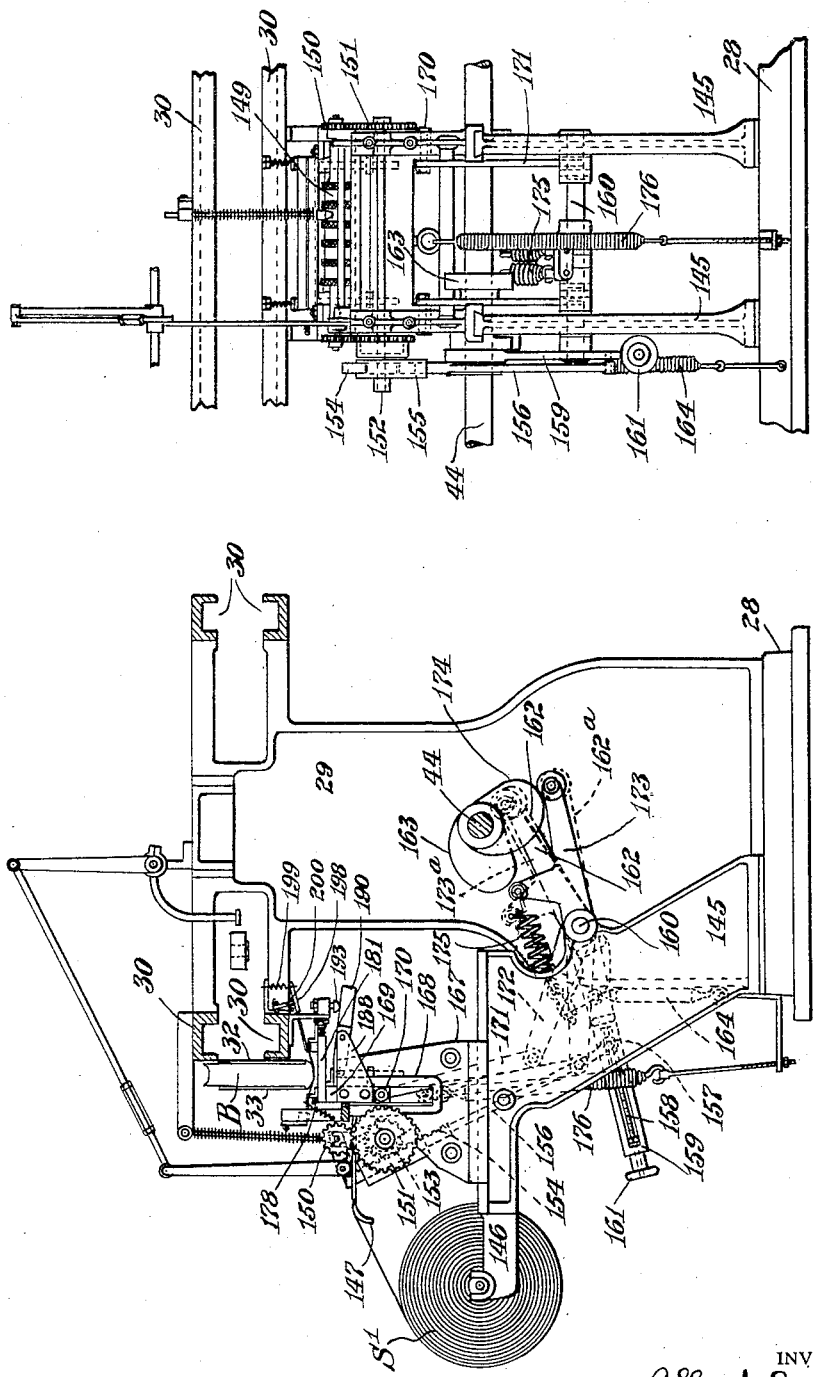

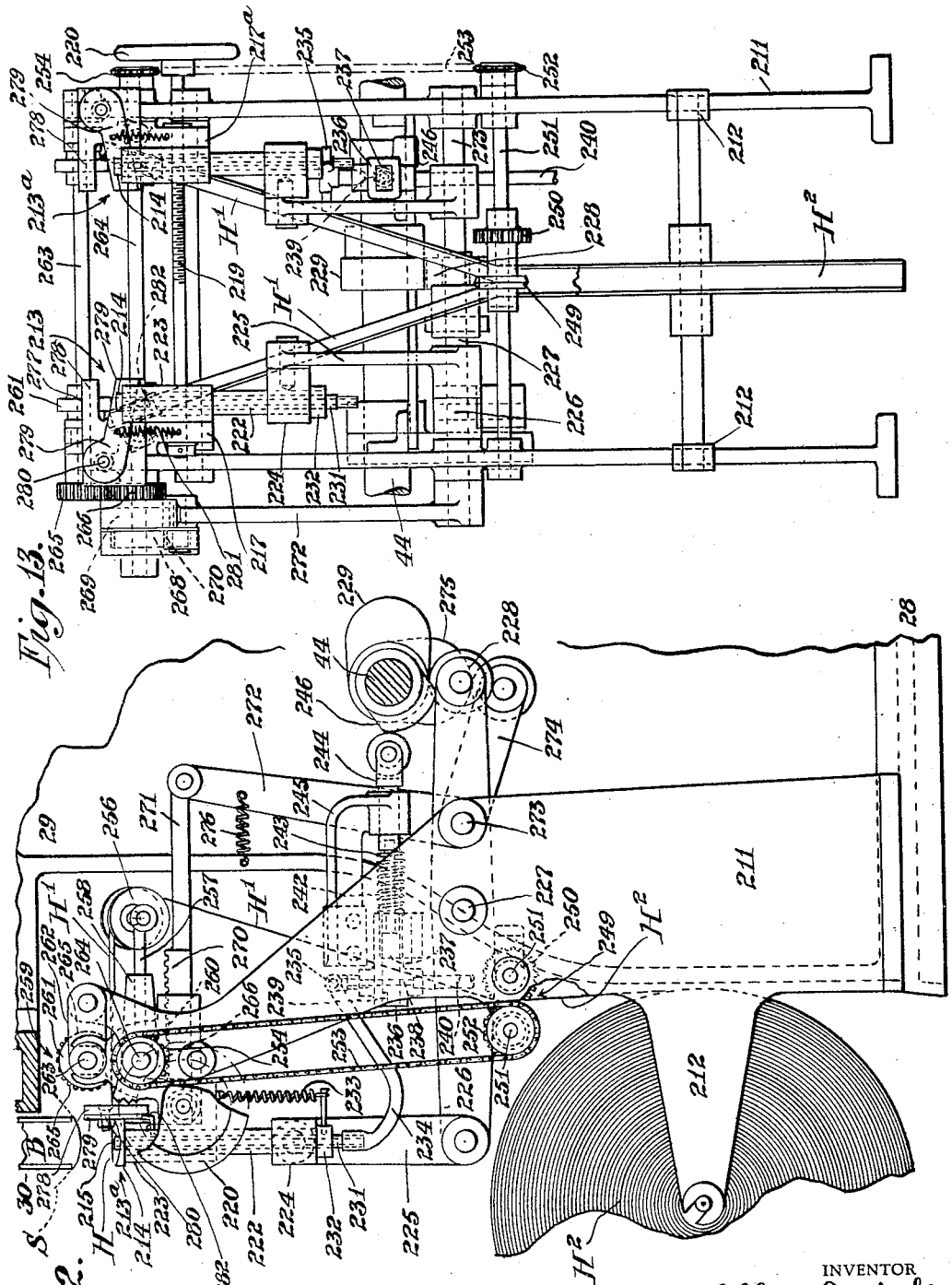

July 19, 1932.  A. BREDENBERG  1,867,803
MANUFACTURE OF BOOKS
Filed Sept. 15, 1927  13 Sheets-Sheet 8
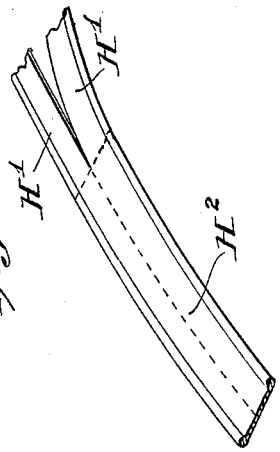
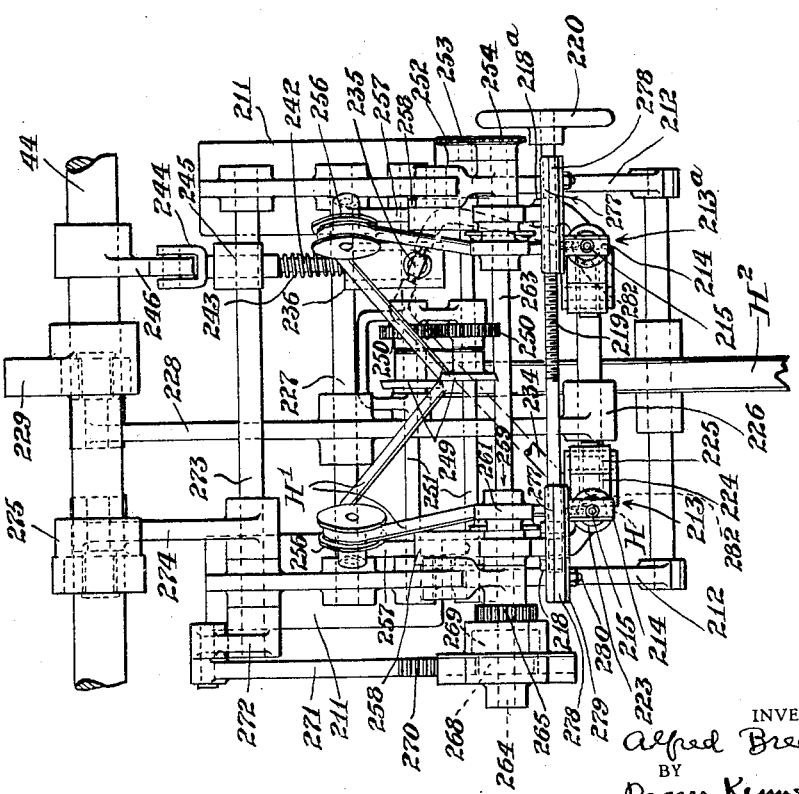

July 19, 1932.  A. BREDENBERG  1,867,803
MANUFACTURE OF BOOKS
Filed Sept. 15, 1927   13 Sheets-Sheet 9
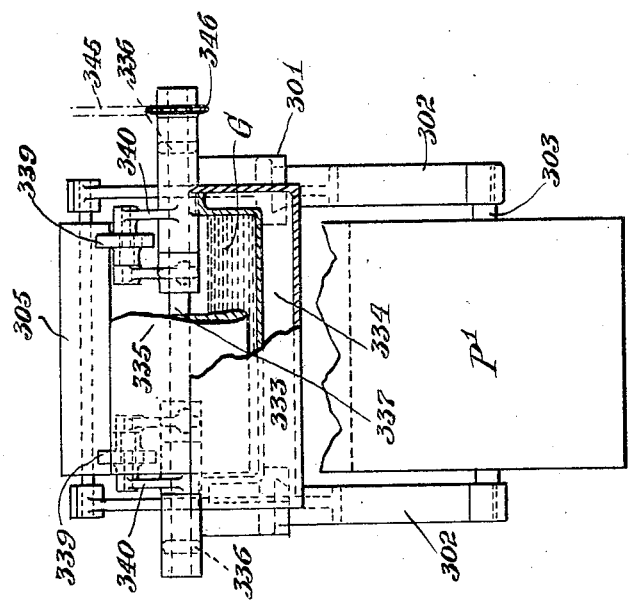
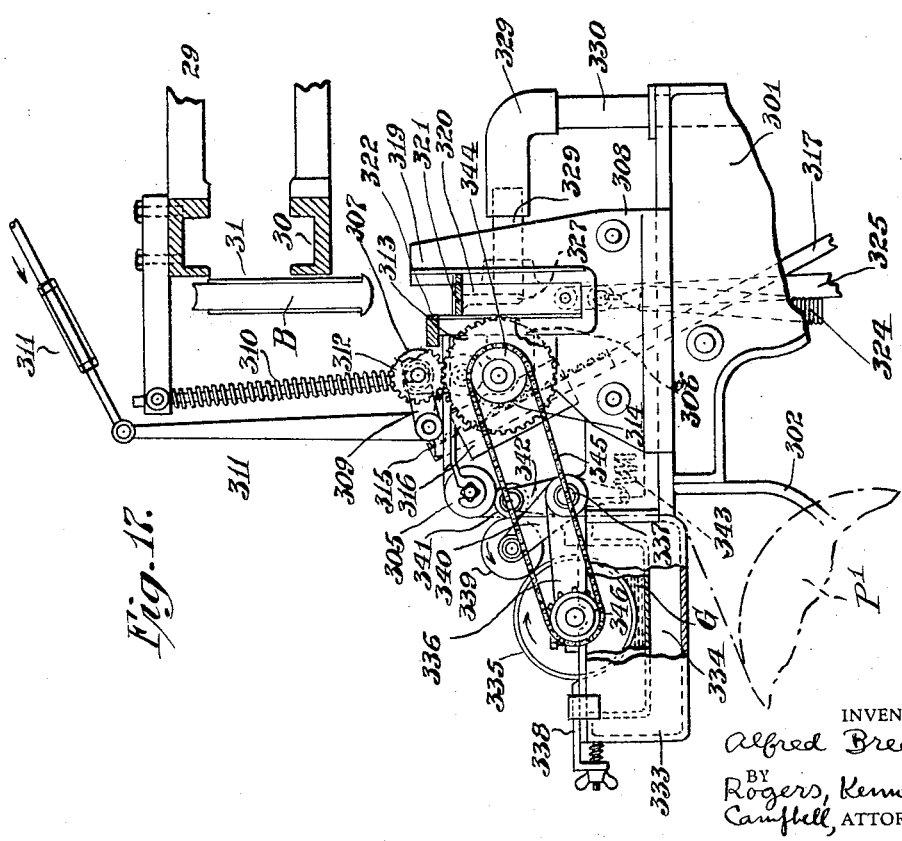
INVENTOR
Alfred Bredenberg,
BY Rogers, Kennedy & Campbell, ATTORNEYS.

July 19, 1932.  A. BREDENBERG  1,867,803
MANUFACTURE OF BOOKS
Filed Sept. 15, 1927     13 Sheets-Sheet 10
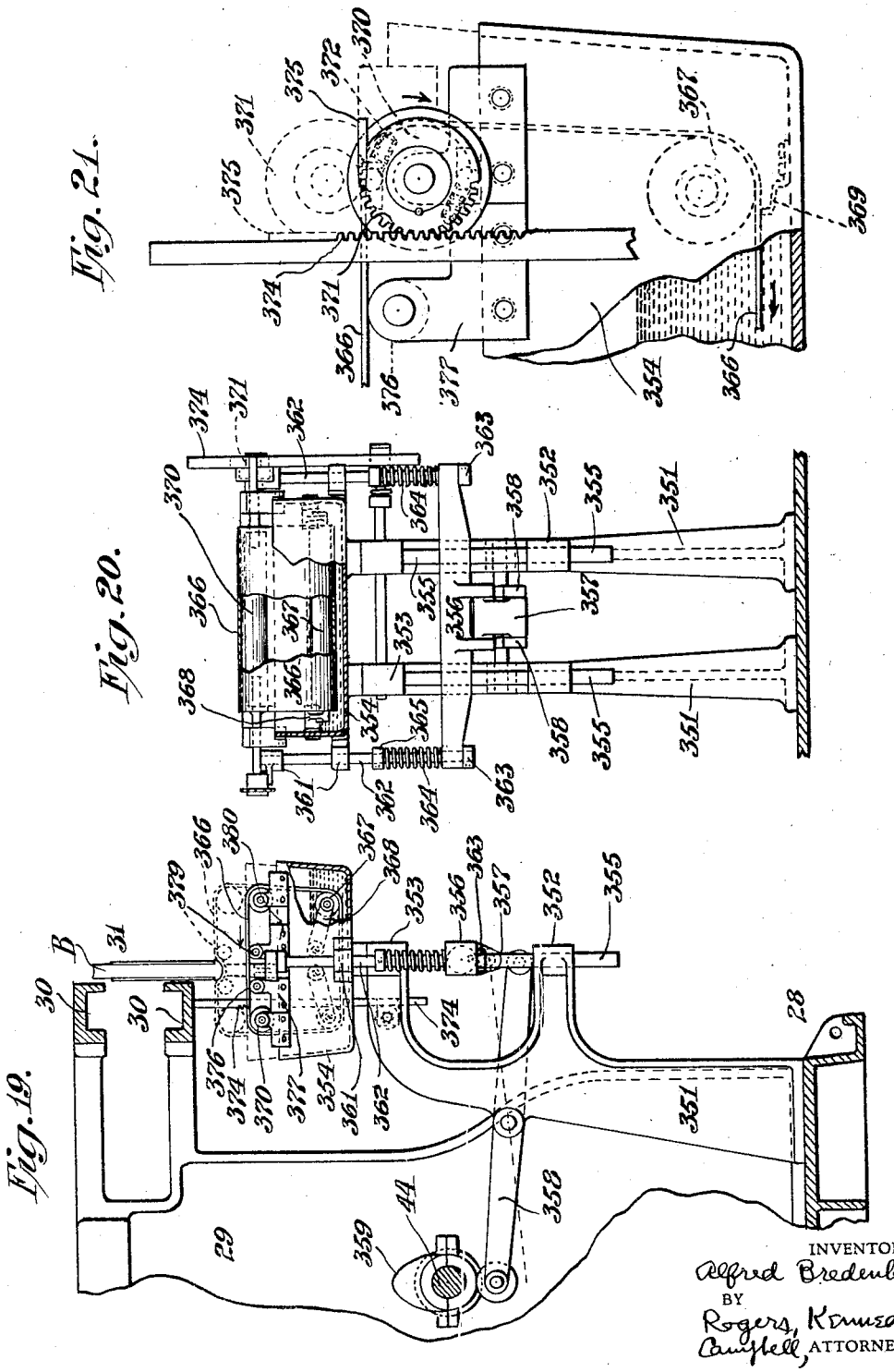
INVENTOR
Alfred Bredenberg,
BY
Rogers, Kennedy &
Campbell, ATTORNEYS.

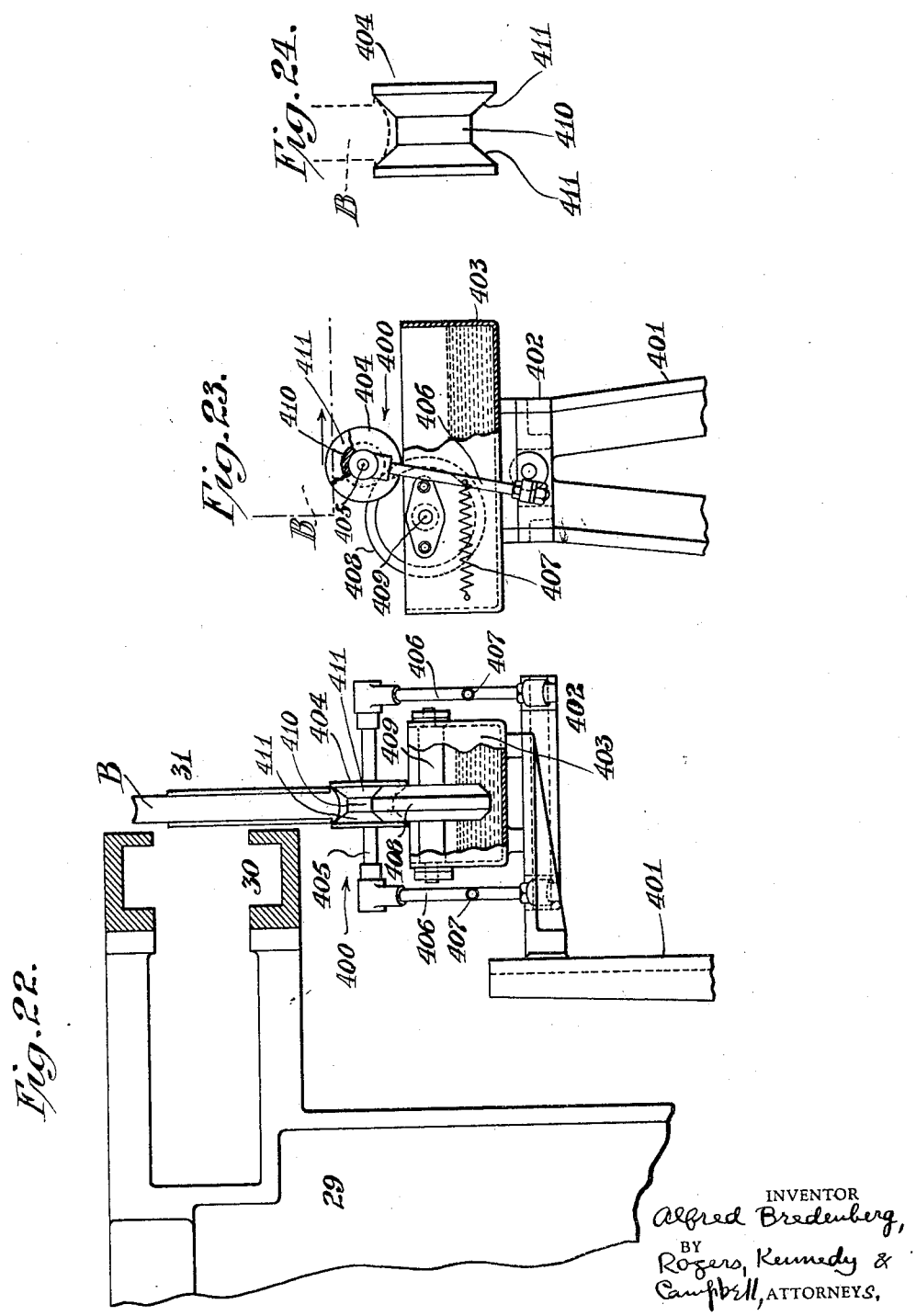

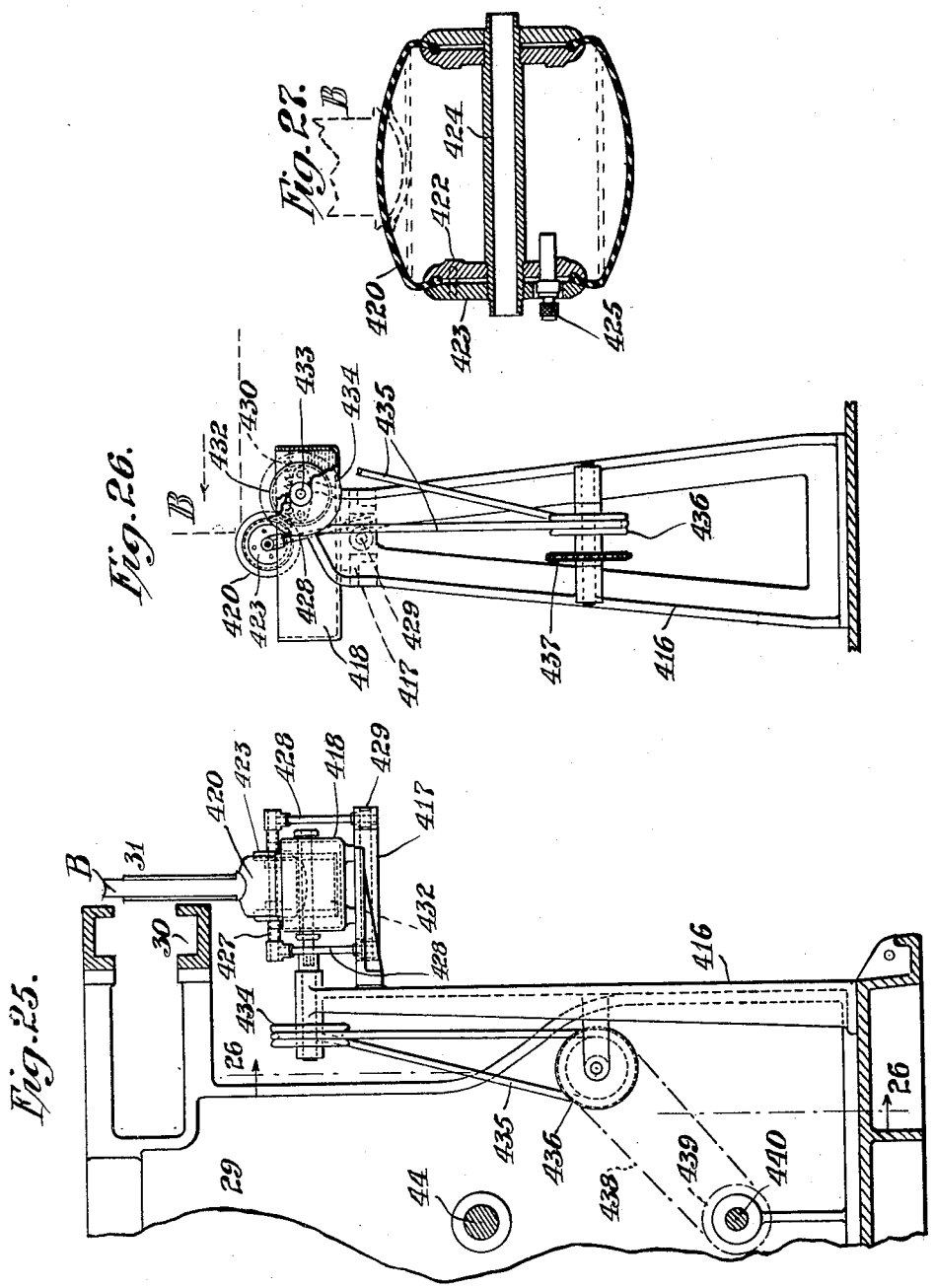

July 19, 1932.  A. BREDENBERG  1,867,803
MANUFACTURE OF BOOKS
Filed Sept. 15, 1927   13 Sheets-Sheet 13
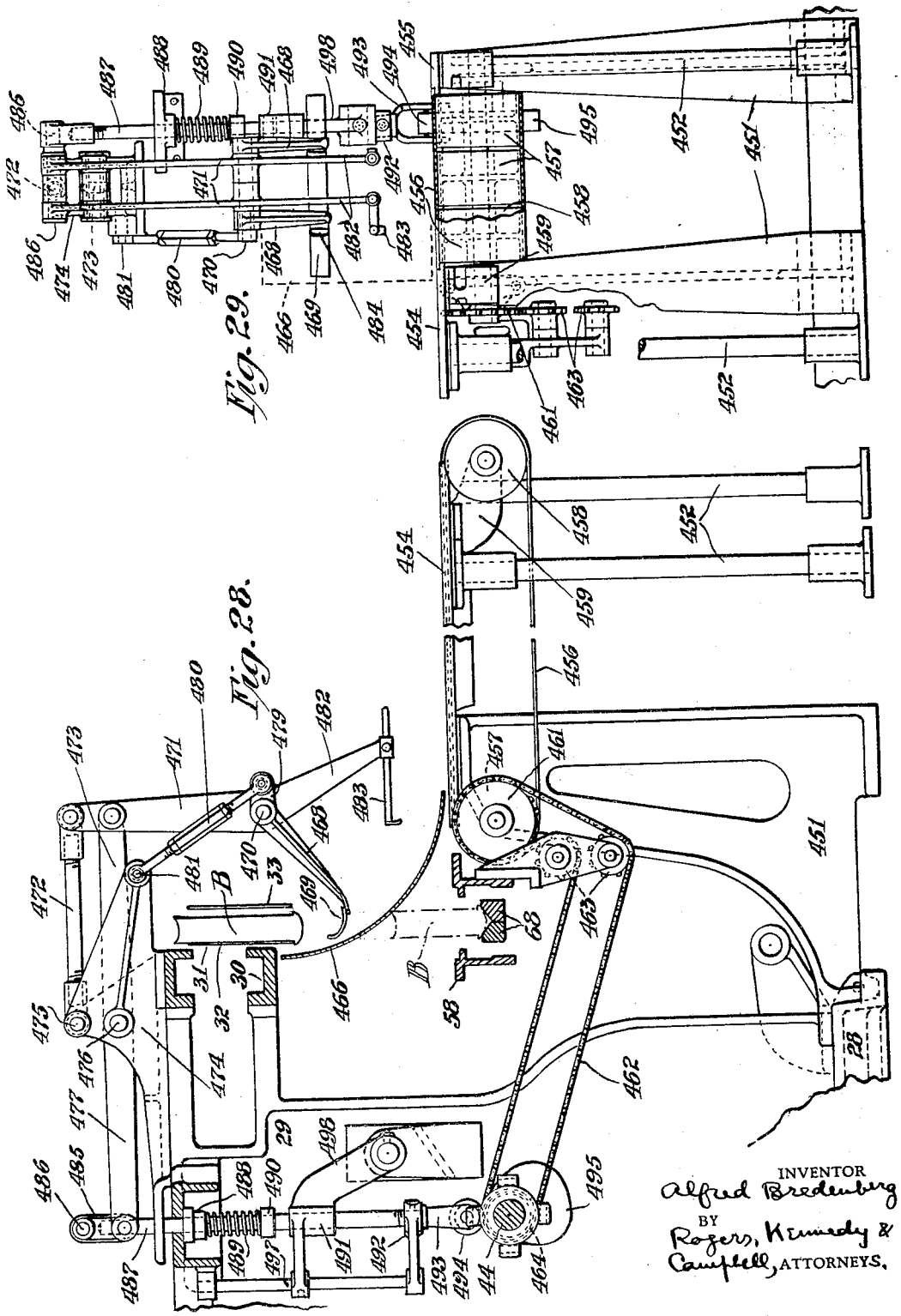

Patented July 19, 1932

1,867,803

UNITED STATES PATENT OFFICE

ALFRED BREDENBERG, OF CHAMPLAIN, NEW YORK, ASSIGNOR OF ONE-HALF TO THE SHERIDAN IRON WORKS, A CORPORATION OF NEW YORK, AND ONE-HALF TO T. W. & C. B. SHERIDAN COMPANY, A CORPORATION OF NEW YORK

MANUFACTURE OF BOOKS

Application filed September 15, 1927. Serial No. 219,712.

This invention relates to the manufacture of books, and involves a novel apparatus, and as well a novel method or system of manufacture. The invention relates more particularly to the stages or steps in the manufacture of a round back book known as headbanding and backlining.

The general object of the invention is to apply in an efficient and convenient manner the headband to the back of a book, and to apply the backlining material, consisting usually of a combination of woven fabric and paper. Round backed books are constituted of signature groups united together usually by thread stitching, and each book after its stitching being "rounded and backed" in suitable apparatus, rounding consisting in shaping the assembled components so as to give the familiar convex curve at the back of the book, and concave at the front side, and backing consisting in the forcible squeezing of the components near the back so as to compress them into an angular recess, while spreading them at the back. The succeeding step is usually the application of headbands, referring to ornamental strips at both the head and foot of the book, when such are to be employed, followed by the application of lining materials as already stated, these being the operations to which the present invention is directed, and constituting a separate and independent character of operation and apparatus. Following the backlining comes usually the "casing-in" operation which consists in inserting and securing each book in the previously manufactured case comprising boards forming the covers and a flexible connecting portion.

Specific objects of the invention are to provide for the performing of each of the successive steps constituting the headbanding and backlining process, in an effective, convenient, simple and rapid manner, and by means of apparatuses and devices simple and durable in structure and operation and coordinated one with another in an advantageous manner.

Other and further objects and advantages of the present invention will be pointed out in the hereinafter following description of an illustrative embodiment thereof or will be apparent to those skilled in the subject matter of book manufacture.

To the attainment of the aforesaid objects and advantages the present invention consists in the novel method of manufacture of books, and the novel book making apparatus, and the novel features of operation, combination, arrangement, construction and detail herein illustrated or described.

In the accompanying drawings Fig. 1 is a diagrammatic top plan view of a book making apparatus embodying the features of the present invention, the successive operating mechanisms being indicated only in outline, to be shown more fully in other figures of the drawings. The apparatus as a whole is shown of the traveling clamp train type, resembling in that respect the well-known Sheridan pamphlet binding and covering machines, the endless train of clamps passing around a closed horizontal path or orbit, with the successive operating mechanisms arranged around such orbit. Hereinafter the terms exterior or interior will be used with reference to such orbit.

Fig. 2 is an exterior elevation view, partly broken away for condensation, of the infeeding mechanism by which the successive round back books are fed into the clamp train, and showing also the book reshaping device of this invention. Fig. 3 is a top plan view of the infeeding and reshaping mechanisms of Fig. 2. Fig. 4 is an end elevation partly in section on the line 4—4 of Fig. 2, of the infeeding mechanism.

Fig. 5 is a transverse section of the reshaping mechanism taken on the line 5—5 of Fig. 2. Fig. 6 is a perspective view of the reshaping mechanism, broken away to indicate its operation.

Fig. 7 is an end elevation of either of the gluing mechanisms. Fig. 8 is an exterior elevation thereof.

Fig. 9 is an end elevation of one of the super applying mechanisms, more particularly the second of such mechanisms. Fig. 10 is an exterior elevation thereof. Fig. 11 is an end elevation similar to Fig. 9 but showing on a larger scale the part of the super applying mechanism adjacent to the book.

Fig. 12 is an end elevation of the headband applying mechanism. Fig. 13 is an exterior elevation thereof. Fig. 14 is a top plan view of a part thereof. Fig. 15 is a perspective view of the applier itself. Fig. 16 is a perspective of the duplex or double edge headband strip both before and after being slit.

Fig. 17 is an end elevation of the paper lining applying mechanism. Fig. 18 is an exterior elevation thereof.

Fig. 19 is an end elevation of one of the back pressing mechanisms, herein referred to as the wet belt presser. Fig. 20 is an exterior elevation thereof. Fig. 21 is an end elevation of a detail, on an enlarged scale and looking in the opposite direction from Fig. 19.

Fig. 22 is an end elevation of the second of the pressing mechanisms herein referred to as the V-roll presser. Fig. 23 is an exterior elevation thereof, partly broken away. Fig. 24 is a detached view of the pressing roll thereof.

Fig. 25 is an end elevation of the third pressing mechanism herein referred to as the cushion roll presser. Fig. 26 is an exterior elevation thereof, partly broken away.

Fig. 27 is an enlarged central section of the pressing roll thereof.

Fig. 28 is an end elevation of the delivery mechanism. Fig. 29 is an exterior elevation thereof.

In the complete headbanding and backlining process as herein performed the following is the preferred order of steps.

Infeeding:—The books are placed one by one from a convenient infeed table by hand into an infeed chute in which a traveling conveyor carries the books edgewise, with their backs downwardly, in single file to the infeed point. The conveyor moves the successive books and inserts them, preferably along an upward incline, into the open clamps of the clamp train.

Reshaping:—This consists in straightening up each book and restoring its rounded and backed condition by a special device which operates before the clamp has closed.

Clamping:—The advancing clamp closes upon the book after this operation and carries the book along to the succeeding operations, in step by step manner.

First gluing:—This applies a coating of glue over the entire rounded back of the book.

First super applying:—The super is a strip of coarse woven fabric or crash shorter than the height of the book and wider than the thickness of the book; the crash is fed and cut off from a roll and lifted into contact with the glued back.

Second super applying:—This is a similar mechanism, but applies a piece of crash preferably shorter and wider than the first, and under tension to give pressure. Both supers eventually have their loose extensions glued against the inside of the board covers of the case, and constitute a fastening between the book and the case.

Second gluing:—A second coating of adhesive is applied on top of the two supers; the second adhesive being sometimes glue and sometimes paste, which combines satisfactorily with the previous glue. The second coat may omit the extreme ends of the book to avoid too great wetness during the delicate headbanding operation.

The steps above enumerated are preferably arranged along the first or rear stretch or side of the horizontal orbit of travel of the clamp train; the following steps being preferably at the front or operator's side, after the book has traveled around the end.

Headbanding:—This step may be omitted, as not all books are headbanded. The headband is a small ornamental piece of fabric such as a strip folded double, with a string inside the fold, and being cut off of proper length for the width of the book and applied at the top and bottom ends of the rounded back, each with its doubled part standing beyond the extreme end of the book. The headbands may in some cases be previously applied to the lining paper before the latter is applied to the book, but the first plan is herein preferred.

Paper lining applying:—This feeds and cuts paper from a roll, of the correct width for the thickness of the book, and lifts it to the glued back so as to overlie the supers and cover the entire rounded back, a special feature being the applying of a stripe of glue along each edge of the paper web where it is to overlie the unglued headbands.

Wet belt pressing:—This is a special step by which the applied paper lining is forced wetly by a transverse belt against the entire book back, during a pause in travel.

V-roll pressing:—This acts progressive during book travel and consists of a roller with V-groove, which is wetted and operates at the outer edges or corners of the book back as it travels over the roller.

Cushion roll pressing:—This also is a progressively acting roller, being elastically compressible, or pneumatic, and operating along the convex curve of the book back, and it may be kept wet or moist.

Further pressing:—There may be a repetition, for example of the V-roll or edge pressing operation, to make a finished result of the pressing.

Setting:—After the final pressing each book preferably travels an extended distance around the other end of the orbit and passes so that the adhesive may set before delivery.

Delivery:—The books are discharged by the opening of the clamp and delivered by a special device which transfers them without injury to a conveyor traveling transversely or outwardly from the machine to a suitable receiving point, for stacking or for infeeding to a casing in apparatus.

The described order and arrangement are not essential and may be varied. The well known hopper type of infeed mechanism may be employed in which successive books are released, dropped, or pushed from the hopper either into the infeeding conveyor, or directly into the clamps. The positions of the various mechanisms around the orbit of book travel may be altered, for example the delivery may be at the front side, opposite to the infeed, and other shifts may be made within the broad principles hereof.

The product of the method outlined consists of the united components, namely the book B to which are united by the glue G one or more crash or fabric supers S and overlying them the paper lining P, and with headbands H between the lining and the ends of the book when headbands are desired.

The general parts of the machine may resemble the pamphlet binding and covering machine of my prior Patent No. 1,248,252 of November 27, 1917 in the inclusion of a heavy base 28 and frame, with cross frames 29, giving support to various elements including the fixed clamp guiding rails 30. Each of the endless series of clamps 31 may comprise the inner clamp member 32 having a fixed relation to the guides 30 and an outer clamp member 33 which is movable outwardly for opening the clamp, this movement being guided by rods 34 surrounded by compression springs 35 and connected by heads 36 which may be thrust outwardly to compress the spring and open the clamp. The hinge studs 37 between the clamps engage and travel in the upper and lower guides 30. In said prior Patent 1,248,252 the clamp travel is continuous and the clamps are opened and closed during travel for receiving clamping and discharging the successive books, whereas in the present machine intermittent travel of the clamp train is preferred so as to give adequate time at each stage or step for the respective operations without incurring the complications necessitated by the continuous travel plan. It is therefore preferred herein to open each clamp while pausing at the delivery point to discharge the completed product, and to close each clamp during a pause beyond the infeed point to clamp a book which has been fed thereinto. Mechanism for opening and closing clamps during the pauses of intermittent travel is shown in my prior Patent 1,073,324 and therefore is not herein fully disclosed or described, but there is indicated in Fig. 1 a clamp opening device 38 adjacent to the delivery point and a closing device 39 adjacent to the infeeding point, the first being cam operated on the principles of said Patent 1,073,324.

The present apparatus is not claimed to be the first of the clamp train type wherein round back books have been back lined, and reference may be made to Lovell & Bredenberg Patent 476,208 of May 31, 1892, Figs. 27 to 37, wherein crash and paper linings are fed and glued to the clamped books, and Lovell Patent 753,435 of March 1, 1904, Figs. 18 to 20, wherein paper lining is fed and glued to the books and pressed.

The driving of the clamp train may be effected through a large sprocket wheel 42, the arms of which have peripheral sockets to receive the hinge studs 37 of the clamps, this being shown in Fig. 1 by the omission of several clamps. The sprocket wheel may be driven in a step by step manner by any suitable intermittent drive such as the mechanism 43, indicated in Fig. 1, which is not shown in further detail as it may substantially follow my prior Patent 1,347,492 of July 27, 1920, said mechanism being, for example of the Geneva motion type, with travel period preferably greater than the duration of each pause. This mechanism receives its power from a longitudinal main shaft 44 which in turn is driven from a power shaft 45 carrying a belt pulley 46. Assuming operation at a speed to advance 40 books per minute, the pause or dwell may be ½ second and the travel period 1 second, affording ample time for the various operations, and permitting an easy start and stop for each step by step advance. Suitable clutch mechanism will be understood for starting and stopping the apparatus, as well as safety appliances and other auxiliaries used with other clamp train machines.

The book handling arrangements are indicated as comprising an infeed table 50 with an auxiliary table 51 spaced from it, these adapted to support books to be fed by hand into the infeed conveyor extending between the two tables. It will be understood that in lieu of inserting the successive books by hand in the apparatus they might in some cases be inserted in an automatic manner either from a supply or stack of books or directly from the apparatus in which the books have been previously treated, namely the backing and rounding machine.

The infeed mechanism 51 comprises a chute composed of upright walls or guides for supporting the books in upright position with their rounded backs underneath, in connection with a concave support or runway along which the rounded backs may slide, and an infeeding chain having outstanding pins properly spaced to engage the successive books and force them along the guiding parts and upwardly into the successive clamps of the clamp train. This mechanism is generically similar to the infeeding mechanism illustrated in Figs. 2–6 of said Patent 1,248,252. It is to be understood that the term chain is intended to include any endless flexible device adapted to engage and cause the infeeding travel of the successive books.

The infeed mechanism, indicated in Fig. 1, is shown more fully in Figs. 2, 3 and 4, which also indicate the base 28, cross frames 29, and a supporting standard 56 for the initial end of the infeed mechanism and tables 54 and 55. The infeed mechanism is supported on a system of two opposite side bars 58 running along level from the infeed tables, followed by similar side bar 59 extending upwardly at a slant to the infeed point, these latter being bodily hinged at 60 for purposes to be described. Supported above each of the side bars 58 are side plates 62 constituting the book guiding chute, these being succeeded by upslanting chute side plates 63 mounted on the side bars 59. These latter plates, or the exterior one of them, is shown hinged at 64 to permit it to be swung outwardly in case of displacement, congestion or jamming of books passing from the chute into the clamps.

The outer chute plates may be adjustable toward and from the inner ones by adjusting screws 65 to allow for differences in thickness of books being handled, the chute plates being generally speaking in vertical alinement with the clamp plates of the book clamps so as to guide the books correctly and slantingly into the clamps as clearly indicated in Fig. 2, the rear clamp rod of each clamp preferably serving as the book engaging part adapted to push forward the books received from the infeed until the clamp closes.

The bottom bar or guide support 68 in the level part of the chute is herein shown as concave or guttered to receive the rounded book back, being preferably formed with angular surfaces as shown clearly in Fig. 4, adapted to give proper support to round backed books of various sizes and curvature without tendency to distort the same. This supporting bar is succeeded by an upslanting bar 69 similarly formed and arranged between the slanted side plates 63 of the chute. Each of the bottom bars or runways is adjustable for differences in book thickness by centering it with respect to the chute upon change of adjustment of the latter. This is herein done by dividing the supporting bar in two halves, mounted to be adjusted with adjustment of the chute plates.

The infeeding conveyor may comprise an endless sprocket chain, or preferably a pair of opposite chains 75, having cross pins 76 extending from one chain to the other and arranged to travel along within the chute just above the bottom bars 68 and 69, these pins being spaced to conform with the spacing of the book clamps so that each pin may force a book slantingly up into the proper clamp. The infeed chains may pass around sprocket wheels 77 and 78 at the beginning and end of the chute, and around a driving sprocket wheel 79, with intermediate sprocket wheels 80 and 81 arranged for taking up slack. The chains in passing from the horizontal to the upslanted portion of the chute are held down by the pins sliding under the chute side plates, and by their own weight. The conveyor chain may be driven through its driving sprocket 79 which in turn is driven by a drive chain 83 turned by a sprocket wheel connected by bevel gears 84 to a counter shaft 85 receiving its motion from the main shaft in synchronism with the other mechanisms of the apparatus.

The upslanting bottom bar 69 of the chute is shown connected at its upper end by a link 87 with a flat receiving plate 88 upon which each book levels itself when carried forwardly from the conveyor chain by the rear rod of the clamp. The receiving plate 88 is supported above a bracket 90 extending horizontally from the side bars 59. The assemblage including the receiving plate, and the upslanted elements of the chute is adapted to be bodily dropped to give access in case of jamming or other accidental condition, by swinging these parts about the hinge 60. The parts are normally supported in position by upper and lower toggle links 91 and 92 connected by a stop piece 93 having a handle 94 which may be thrown to break the toggle and drop the assembled parts.

The operations of the apparatus are preferably so timed that each clamp will be allowed to close upon its book while the book is resting on the receiving plate 88 and after the clamp has paused at such position, but not until the book has been wholly engaged by the reshaping device about to be described, illustrated in Figs. 2, 3, 5 and 6.

The reshaper 95 is shown as a stationary device acting progressively upon the advancing book between two stopping positions and before the book is gripped by its clamp. The reshaper has two undercut side pieces or bars 96 overlying the latter part of the receiving plate 88. By reason of the undercut each of the reshaper bars has an inward flange 97 and these two flanges extend toward each other. Each of them is curved away from the center at its first portion so as to give a converging entrance for the body of each book, and the entrance for the extended edges of the rounded back of the book is also converged vertically, to receive easily the book. The two flanges 97 are spaced apart a proper amount to confine the body of the book snugly between them, while the rounded back portion of the book extends into the undercut spaced beneath the flanges. In this way each book as it enters the reshaper is restored to its proper rounded and backed condition and straightened up before the closing of the clamp, as well shown in Fig. 6, so that the book will be held properly by the clamp during the subsequent operations of backlining and head banding. The outer shaping bar 96 may be adjustable to and from the inner one for variations in books, namely through set screws 98, working in slots 99, which may be loosened for the adjustment of the bars and tightened. Vertical adjustment can be effected by placing thin layers or shims beneath the respective bars, preferably with a wedging adjustment.

Following the reshaper is the first gluing mechanism 101 and then the super appliers 143 and 143ª and then the second gluer 101ª. The two gluing mechanisms may be similar and involve certain principles as disclosed in detail in Figs. 7 and 8. The disclosed gluer operates through a longitudinal glue roll which is moved transversely across the rounded back of the book during the pause in the travel of the book. In fact preferably the glue roll is moved in both directions, inwardly and outwardly, below the book during the pause of the latter, giving certain advantages.

Mounted on a pair of special cross frames 100 are brackets 102 giving support to a glue vessel 103 which preferably remains stationary throughout the operations and may have glue supply means and heating means as is customary for glue tanks. The brackets 102 may be vertically slidable on the frames and adjustable by a gear 104 running on a rack 105 to set the glue tank to the correct height. In the upper part of the wall of the glue vessel is mounted the axle of a glue feed roll 106 turning in the adhesive. A smaller glue feed roll 107 remains in constant contact with the large roll and is supported on a swinging arm 108 fulcrumed on a bracket 109, its weight partially taken by a supporting cushion spring 110. These parts are preferably maintained in constant rotation through a system of gearing 111 between the glue feed roll 106 and the shaft 112 of a sprocket wheel 113 which is driven by a sprocket chain 114 from a sprocket wheel 115 turning with a gear 116 which engages a larger gear 117 mounted on a counter shaft 118 suitably rotated preferably independently of the main shaft to avoid stoppage with the machine.

The glue is applied to the book by a roll 120 which is movable transversely of the travel of the book. Fig. 7 shows in dotted lines the normal position in contact with the small feed roll 107, by which arrangement it is maintained constantly wet with glue. In this position it nearly contacts the outer corner of the rounded book back. Its transverse movement is guided by and coincides with the curved back of the book, and Fig. 7 shows its furthest or retracted position, in full lines. The glue roll 120 is preferably of the full length of the book in the first gluing mechanism, but in the second gluing mechanism it may be a fraction of an inch shorter at each end, so that the extreme end portions of the book will not be too wet with glue when the book reaches the position in which headband strips are to be applied to the ends of the book.

The glue roll 120 may be removably mounted on a core 121 and operated in the following advantageous manner. It is carried at the outer ends of carrying bars 122, the inner ends of which have fixed to them collars 123 pivoted to the upper yoked end of a carrying lever 124 which is fulcrumed at its lower end, for convenience upon the counter shaft 118, this lever adapted to be swung outwardly and inwardly to give the glue roll its transverse movements. The glue roll carrying rods 122 are shown as resiliently pressed upwardly by means of a tension spring 125 coupled with an adjusting rod 126, the two extending from a convenient point 127 near the lower end of the lever to the extreme rearward extensions of the rods 122, so that by pulling down at this point the outer end of the rod is constantly lifted, giving a resilient pressure against the rounded book back.

The retracting or inward and advancing or outward return movements of the glue applying roll 120 may be effected by cam control so as to take place during the pause of each book. For this purpose the carrying lever 124 is shown as provided with a cam roller 128 engaging the groove 129 of a cam 130 on the main shaft 44. As appears in Fig. 7 the lever and roll are in their inward positions and about to return outwardly, where they dwell until the next book pauses at the gluing station.

The swivel connection of the carrying rods 122 upon the lever 125 allows for the upward and downward movements as the roller rolls across the convex back of the book, while the spring effects an upward pressure of the roll upon the book. Preferably the glue roll is constantly power rotated in such manner that in one movement it will substantially roll across the back of the book while in the other movement its rotation will be counter to the movement across the book, thus scrubbing the glue into the book. For this purpose a sprocket wheel 132 is shown on the shaft of the glue roll, this connected by a sprocket chain 133 with a similar sprocket wheel 134 near the rear of one of the bars. Alongside of this is another sprocket wheel 135 connected by chain 136 with a sprocket wheel 137 attached to the gear 117, so that the glue applying roll is constantly rotated from the same source as the glue feeding rolls. Preferably the direction of rotation is such, as indicated, that in the first or inward movement of the roll 120 it rolls across the book back while in the outward or return movement it gives the scrubbing action described causing the glue to enter the recesses between the components of the book back.

An arrangement to prevent the applying of glue to the book clamp 31, if the latter should be empty, consists in a collar 139 on one or both of the bars 122, this collar having an upper surface formed with a curved protuberance 140 in the nature of a cam adapted to be engaged by a cam roller 141 mounted in a fixed position by a bracket 142 attached to the lower clamp guide rail 30. These parts are so arranged and timed that when the glue roll acts normally upon the book the cam and roll are inoperative whereas if a book is missing the roll will nevertheless make a dipping movement so as to clear the metallic portions of the clamp.

The two super appliers 143 and 143ª may be generically similar, but the first one may have the crash super applied merely by contact without stretching it forcibly in place as is preferably done with the second super. The first super applier therefore is not shown in detail, but the second one is shown in Figs. 9, 10 and 11. The operation of each is to feed the crash from a roll and trim off a length of it somewhat wider than the book and apply it to the glued back thereof. The pneumatic plan may be employed for handling the light fabric material constituting the super, this plan being shown in my prior Patent 1,248,254 of November 27, 1917 and in my earlier Patent 1,129,064 of February 23, 1915, and as in those patents the woven piece may be held in place upon the applying device by suction of air while the latter is lifted to a position closely beneath the book, the air flow being then reversed, causing a puff of air which projects the strip upwardly against the book without need of the applier contacting the glue. Pneumatic operation may be dispensed with in using the mechanical operation of the second applier as shown.

The super applying mechanism is shown in Figs. 9 and 10 as mounted upon standards 145 arranged between two of the cross frames 29. The outer ends of the standards carry brackets 146 for a roll or supply S' of super material or crash. From this roll the material passes over a curved approach plate 147 and thence over a main feed roll 148 above which is arranged a smaller and complementary feed roll 149 having serrated surface portions. The upper roll may carry at its end a gear 150 engaging with a gear 151 on the lower roll so that they will rotate in unison. The shaft 152 of the lower gear may be operated by an intermittent toothed or ratchet device 153 in connection with a reciprocating rack 154 sliding in a guideway 155. This arrangement is such that each upward movement of the rack causes a feeding operation of the rolls, while the return or downward movement is without effect. The rack is shown connected by a rod 156 with a threaded block 157 engaged upon a threaded rod 158 mounted on a rock lever 159 fulcrumed on an axle 160 on the standard 145, so that by turning the hand piece 161 of the threaded rod the block may be adjusted along the lever and thus change the throw of the rack to adjust the amount of feed of crash. The rack and its guide, or the rod 156, may be swingingly mounted to permit this adjustment. The rock lever is shown prolonged inwardly at 162, with the extremity thereof provided with a cam roll through which the lever is oscillated by a cam 163 on the main shaft 44, opposed by a spring 164 applied to the lever 159. By this arrangement the crash is fed inwardly to the proper extent at the proper point of time in the cycle of operations for each of the successive books.

An upper bracket 167, mounted upon the standards 145, is formed with a vertical slideway 168 for an upwardly and downwardly sliding carriage 169. This carriage is normally in lower position to receive above it the material fed from the crash supply, and is lifted to move the crash toward the book. Fig. 9 shows the carriage in raised position, with the operating connections shown both in raised and lowered position, while the enlarged view Fig. 11 shows the carriage in full lines in partly raised position and in dotted lines in lowered position. The up and down movements may be effected through a thrust pin 170 at the lower part of the carriage connected by rods 171 with the outer ends of lever arms 172 attached to the rock shaft 160. An inward extension or lever arm 173 carries a roller which bears on a cam 174 on shaft 44. In Fig. 9 the cam has depressed the inner arm 173 and raised the outer arm and carriage. Fig. 9 shows also the elevated or normal position 173ª of the inner arm and a spring 175 tending to hold the arm up against its cam. The carriage is constantly pulled down by a spring 176.

When the carriage is lowered and after the crash is fed inwardly upon the carriage to the proper extent, the carriage may be lifted to raise the strip of crash toward the book, and it may in the same movement effect the severing of the strip. For this purpose a fixed knife 177 is shown mounted on the slideway 168, while the carriage supports a complementary knife or blade 178. The blade 178 may slide along ribs 179 formed on the slideway, and the two blades may be slightly inclined and arranged to give a shearing action upon the fabric.

Upon the carriage is supported a relatively movable carrier or lifter 180 comprising a main plate 181 extending substantially symmetrically beneath the book and having at its outer edge a downwardly extending shank 182 fitted for up and down sliding movement in the carriage. In both Figs. 9 and 11 the lifter or carrier is shown in its relatively elevated position in full lines, while in Fig. 11 in dotted lines it is shown relatively depressed. In its depressed position the lifter lies entirely below the infeeding level, which corresponds substantially with the lowered position of the blade 178 as shown in dotted lines in Fig. 11. The crash therefore is fed inwardly over the lifter, and indeed over the longitudinal blocks 183 and 184, mounted at the inner and outer longitudinal edges of the lifter respectively. The inner block 183 has a gage rib 185 serving to position the crash strip when fed onto the lifter and the parts 183 and 185 are adjustable laterally to accord with the extent of feed and the desired width of crash, namely by means of an adjusting device 186. The crash super is of fairly stiff material and will normally lie flatly across the tops of the blocks 183 and 184, as shown in dotted lines in Fig. 11.

The preferred plan of operation is that the carriage rises with the lifter, and after causing the severing of the fabric continues to rise, but at a slower rate than the rise of the lifter, the latter being accelerated, lifting the fabric away from the carriage and knife and applying it to the glued back of the book. This accelerated movement of the lifter may conveniently be effected as follows. Standing inwardly from the carriage are a pair of rigid extensions 188 supporting a longitudinal axle 189 on which is supported a Y-shape or yoked lever 190, the outer ends of which engage in slotted collars 191 surrounding the stems 192 of the lifter. The inner end of the lever 190 is arranged to come up into contact under a fixed stop 193 mounted on a bracket 194 attached beneath the clamp guide 30. During the rise of the carriage, after the lever 190 contacts the stop 193 the other end of the lever, carrying the lifter, will be caused to rise with accelerated speed, for example twice the speed of the carriage, thus relatively raising the lifter until the parts reach the lifted position as shown, and further to the final lifted position.

In order to grip or hold the inner and outer edges of the fabric strip during this lifting movement, so as to apply it with tension to the book back, the following gripping mechanism may be employed, cooperating with but preferably not carried upon either the lifter 181 or carriage 169. The two blocks 183 and 184 which support the inner and outer margins of the super are herein employed as gripper members in cooperation with complementary gripper members mounted in fixed positions so as to contact the super margins as the latter is lifted toward the book. Thus, opposite and above the block 183 is a resiliently yielding gripper 196 in the form of a light plate or series of fingers with their inner terminals directly above the block 183. The gripper 196 may be swingingly pivoted at 197 to the bracket 194 and may have an extension 198 pulled upwardly by a spring 199 to give forcible gripping pressure when the gripper is in action. An adjustable stop contact 200 may be employed to limit the downward movement of the gripper fingers 196. In Fig. 11 these fingers are shown in their lowered or normal position, and the gripper block 183 has risen just to the point where the super is brought into contact with the fingers, the stretching action being caused by a slightly additional lifting movement of the lifter and gripper blocks. At the other or front side, above the gripper block 184 is shown a gripper plate or series of fingers 202. These analogously may be fulcrumed at 203 and provided with an extension 204 carrying an adjustable stop contact 205 while a spring 206 is arranged to hold the fingers 202 in their lowered position with the stop 205 in contact with the side of the bracket 207 mounted upon the bracket 167.

From the above description it will be clear that is the carriage rises, and as the lifter is accelerated relatively beyond the lifting movement of the carriage, the gripper blocks 183 and 184 will bring the margins of the super into contact with the gripper fingers 196 and 202 just about the time that the middle part of the super comes in contact with the glued back of the book, while the subsequent and final lifting movement of the lifter applies a tension and causes a strong stretching action which applies the super forcibly to the book, causing the glue to squeeze through both the first and second super and insuring that the supers will adhere to the book and be carried around through the subsequent stages of operation.

Following the application of both supers each book travels to the second gluing mechanism 101ª, receiving a coat of glue or paste over the supers, but not extending to the extreme ends of the book, the tacky adhesive previously applied being relied upon for the later attachment of the headbands which are applied in dry condition. This arrangement minimizes chance of displacement of the headbands due to excessive wetness and slipperiness at the ends of the book. Each book travels from the second gluer and passes around the end of the machine, with several pauses in travel, eventually pausing at the headband applying mechanism 210, which is indicated in the diagram Fig. 1 and shown in detail in Figs. 12 to 16.

The headband being a small narrow strip requires to be handled and applied with great exactitude. Each individual headband may be severed from a supply roll after the latter has been advanced to bring the strip into position beneath the book. A double edge headband strip is preferred, which is drawn from the roll, slit into two strips and conducted to the applying devices 213 and 213ª at the two ends of the book. The plan of this invention is to hold and control by suction means the position of each severed headband strip, which is dry, until it has been applied. Each of the applying devices may be arranged to lift the headband to the book, this applier comprising, at the middle part of the headband, a suction holder or head 215 which holds the headband until it has been lifted and applied to the book, this suction head being sufficiently narrow to permit it to apply mechanically and press the middle portion of the headband to the book, without receiving glue from the book, and a shaper 214 comprising extensions or wings, preferably curved, which thereafter bend or shape the headband around into more complete contact with the book, where it adheres in correct position and strongly enough to remain until further fixed in place by the subsequently applied paper lining.

In Figs. 12, 13 and 14 are shown a pair of standards 211 supporting the headband applying mechanism. Extending outwardly from the standards are a pair of brackets 212 for carrying a supply roll of double headband strip $H^2$, having a bead or enlargement at each edge as shown separately in Fig. 16. The duplex strip passes upwardly from the roll through a slitting device which cuts it into two single headband strips H′ which are conducted divergingly to the applying devices or heads 213 and $213^a$, one of which applies the strip to the head of the book and the other to the foot. The two complete appliers are substantially symmetrical duplicates of each other so that a single description will serve for both. The first or left hand one of the appliers 213 is fixed in location, while the second or right hand one $213^a$ is adjustable in location to adapt the headbanding mechanism to books of different lengths, and the headband may be registered by contact of a part of the mechanism with the front end of the book. It will be understood that the books progress around the horizontal orbit standing edgewise with their backs down, and that in each clamp the book has its rear end in contact with the rear clamp rod as already explained in connection with the infeed. The position of the rear edge of each book therefore is a predetermined position when arriving at the headbanding mechanism, whereas the position of the advance end of the book is variable according to the length of the book. Each of the two headband appliers as stated may comprise two cooperating elements, first the shaper 214, concave to conform with the convexity of the book back, and second the holder, suction piece or nozzle 215 arranged centrally of the shaper and book and adapted to hold the headband strip before and during the applying operation.

The means for adjusting the relative locations of the two appliers 213 and $213^a$, or varying their spacing to suit different books, may be first conveniently described. The applier 213 is shown mounted on a carriage 217 and the other applier is mounted on a similar carriage $217^a$. The carriage 217 carries an unthreaded sleeve 218 engaged upon an adjusting shaft 219, while the carriage $217^a$ carries a threaded sleeve $218^a$ engaging the threaded portion of the shaft. At an exterior point the shaft carries a hand wheel 220 by which it may be rotated to adjust the carriage $217^a$ longitudinally of the book travel and thus accurately set the second or right hand applier $213^a$ to the foremost end of the clamped book.

Referring next to the fittings and connections of each of the applying devices, the shaper is shown as mounted at the top end of a hollow slidable shank 222 moving in a fixed guideway 223. Below the guideway, at the lower end of the shank 222 it carries a cross-head 224 which is connected by a link 225 with the outward arm 226 of a cam lever fulcrumed at 227 and having its inner arm 228 provided with a cam roll bearing upwardly upon a cam 229 turning with the main shaft 44. By this arrangement, during each cycle, while the cam makes a complete turn the cam lever is swung and thereby thrusts the shaper 214 upwardly to the book and returns it to the normal position shown.

The suction holder 215 may consist merely of the top end or nozzle of a pneumatic pipe 231, and this is shown as mounted slidingly in the interior of the shank 222 of the shaper. The lower end of the pipe projects below the cross-head 224 and is provided with a collar 232 normally bearing on the crosshead and held upwardly by a spring 233. By this arrangement the suction holder is yieldable relatively downwardly. In other words as the shaper is lifted to the book the suction holder lifts it, carrying the headband strip H, until it contacts the center of the book back. The book then forms a stop preventing further rise of the suction holder, while the shaper continues to rise and complete the applying operation.

The pneumatic connections to the suction holder and pipe 231 may comprise a flexible tube 234 extending from a T connection 235, the T permitting a flexible connection to each of the two headband applying devices. The T is connected to the top passage of a valve 236 which consists of a fixed casing containing a horizontally shiftable valve slide 237. The valve slide contains a suction passage 238 and a relief passage 239. The lower side of the valve has a permanent pipe or connection 240 from an air pump, bellows or other suction device. The valve slide is shown in its outward position with the suction passage operative, so that air is being drawn from the passages and holding the headband strip in place. When moved inwardly, or to the right in Fig. 12, the valve slide disconnects the suction passage and substitutes the relief passage 239 which admits atmospheric air to the flexible tube 234 and the suction holder, thus releasing the headband, after it has been applied to the book.

The pneumatic valve may be arranged and operated as follows. The valve slide is formed with a stem 242 surrounded by a spring 243 bearing inwardly, or to the right in Fig. 12, upon a square slide bar 244 connected to the valve stem, and mounted slidingly in a special bracket 245. The bar 244 carries a cam roll bearing on a cam 246 on the main shaft 44. The cam forces the slide outwardly and the spring restores it. By this arrangement the suction connections are rendered operative as soon as the headband strip has been fed over the suction holder and before the same has been severed, the suction remaining in effect until after the headband has been lifted to the book and bent around into position by the shaper, the suction thereupon being relieved to permit the return of the parts to normal position without detaching the headband.

The slitting of the duplex headband strip into two single strips may be effected by a pair of cooperating rotary cutting disks 249 mounted slightly above the point where the duplex strip leaves the supply roll. These slitting disks 249 have mutually engaged gears 250 for rotation in unison. The drive may be effected by a sprocket wheel 252 on the shaft of the outer disk, this being engaged by sprocket chain 253 engaging also a driving top sprocket 254 on a shaft 264 to be later referred to.

After the slitting the two single strips are diverged and carried about a pair of idler pulleys 256 swivelled on supporting rods 257 capable of turning in supporting brackets 258, so that the pulleys can adjust their positions to such diagonals as most effectively to receive the respective strips, ascending on an incline, and feed them horizontally to the intermittent feed devices 259.

Each of the feed devices consists of a lower feed disk 260, in the nature of a draw roll of narrow width, and a cooperating upper feed disk or roll 261. The two disks 261 are carried on swinging arms 262 through a shaft 263 journalled thereon, gravity holding them in place. The lower draw rolls or disks 260 are mounted on a shaft 264 which also carries the sprocket wheel 254 through which the slitting disks are driven. The two shafts 263 and 264 are provided with gears 265 and 266 meshing with each other so that the rolls rotate in unison.

The intermittent actuation of the feed rolls may be produced as follows. A gear 268 is shown loosely mounted on the lower shaft 264, with a roller pawl device, or one-way clutch 269, between it and the shaft. The gear is engaged and driven intermittently by a rack 270 which is reciprocated inwardly and outwardly, at each inward stroke driving the gear 268, the clutch 269 and the shaft 263, but on each outward movement effecting no actuation due to the character of the clutch.

The rack 270 has a rearward extension 271 in the form of a rod connecting with the upper end of a lever arm 272 fulcrumed at 273 and provided with a cam arm 274, which latter carries a roll traveling on a cam 275 on the main shaft 44, with a spring 276 acting on the lever to hold it to the cam. By this arrangement the swinging movement of the cam lever effects the in and out reciprocation of the rack and thereby the intermittent advance of the headband strip H' at each side of the machine in coordination with the severing and applying operations.

The strip severing mechanism may be mounted on a bracket 277 and preferably comprises first a fixed shear blade 278 having a recess through which the headband strip is fed to the applying point, and a swinging shear blade 279 fulcrumed at 280 to the fixed shear blade and with a spring 281 pulling downward to retract the movable blade. The shearing operation may be effected during the lifting movement of the applier, namely by a pin 282 extending inwardly from the shaper shank 222 and positioned to contact and lift the swinging shear blade during the elevation of the latter toward the book. The feeding, lifting, shearing and suction operations are all co-ordinated to apply a headband accurately at each end of each book during its pause at the headbanding station or position.

The paper lining applying mechanism 300, shown in Figs. 17 and 18, performs the service of severing or shearing from a wide web of paper a strip of the proper dimensions to form a paper lining for covering the glued back of the book, partly covering the supers, and covering the headbands. In general the mechanism may be similar to the first super applying mechanism, or the headband applier, in respect to the intermittent feeding of the web, the cutting off of a strip, the pneumatic holding of such strip on the carrier or lifter, and the subsequent lifting and application thereof to the glued back of the book, in this case preferably by reversing the suction flow so as to cause a puff of air to project the strip across the small separating space, thus applying it without mechanical contact and obviating spreading of glue. The web may be wider than needed and adjustably trimmed at one edge en route to the feeder to accord with the length of the book back. A special feature in the illustrated paper lining applier consists of means for applying along each side edge of the web, that is along the end edges of the strip portion to be applied, a stripe of adhesive or glue, where the lining is to overlie the headbands, which latter, in dry condition, have already been applied over the extreme ends of the glued back of the book. By this combination and sequence of operations, in conjunction with the subsequent pressing operations the book, the supers, the headbands and the paper lining are firmly and permanently consolidated and united by the adhesive.

The paper lining applying mechanism is shown mounted on a pair of standards 301 upstanding from the base of the machine. At the outer sides of the standards are attached a pair of brackets 302 supporting the ends of an axle 303 on which the supply or roll of paper P' is maintained. The paper web as it is drawn from the supply passes upwardly and over a guide roll 305 from which it passes horizontally inwardly between lower and upper feed rolls 306 and 307, the latter being short so as not to contact the web margins. This system of rolls is mounted on a top bracket 308 resting on the standards 301, the top roll being mounted on a swinging arm 309 pivoted on the bracket. A spring 310 gives downward pressure, while connections 311 operate to lift the arm and roll to prevent feed when a book clamp is empty.

The step by step feed of the paper web may be effected as follows. The top feed roll 307 carries a gear 312 and the lower feed roll a larger gear 313 mutually engaging for coordinate rotation. The rotation may be effected by a one-way clutch device 314 in the nature of a roller pawl drive comprising a gear operated by a rack 315 sliding in a guide 316 and with a connecting rod 317 reciprocated from a suitable cam lever, for example as with the super and headband appliers.

The lifting and severing of each strip may be by the following means. The top bracket 308 has formed in it a vertical slideway 319 for an upward and downward sliding carriage 320. The outer edge of this carriage constitutes a blade 321 cooperating with a fixed blade 322 on the slideway, so that when the web has been fed forwardly upon the carriage and the carriage is lifted this will sever the desired lining strip from the web. The carriage may be constantly pulled downwardly by a spring 324 and may be lifted at timed intervals by a connecting rod 325 operated from a suitable cam lever, as with the super and headband appliers.

Pneumatic arrangements are indicated in the form of vertical air channels 327 in the carriage, connecting by nipple 328 and elbow 329 with a vertically sliding pipe 330 having its lower end suitably connected with pneumatic apparatus, with a timed valve determining the periods of suction and compression air. From the time the carriage receives the fed paper the latter will be held in position on the carriage by suction, and when the carriage later lifts to a point very close to the book back the air flow will be reversed and a puff will carry the lining strip upwardly into contact with the book, upon the principles already mentioned.

When headbanded books are being manufactured it is desirable to provide, along the two end margins of the paper strip, a narrow stripe of glue which will overlie and adhere to the headbands, the body of the paper strip being dry and adapted to adhere to the glued back of the book between the headbands. For these purposes there is indicated a glue vessel 333 which may be kept warm by steam in space 334. A glue feeding roller 335 is mounted in the glue vessel and at its ends is carried on arms 336 mounted on an axle 337. At the outer side of the glue vessel is mounted an adjustable scraper 338 to limit and adjust the amount of glue carried around by the roller.

Between the glue feed roller 335 and the advancing paper web are a pair of glue applying disks 339 carried on arms 340 mounted on axle 337. These disks or short rolls 339 are arranged to contact and be driven by the glue feed roller 335, thus receiving a continuous supply of adhesive, while each glue disk is set to contact upon one of the side margins of the paper web, so as to apply a stripe of glue to each end of the strip on the principles stated. At the inner side of the traveling paper web are a pair of pressure rolls 341 opposing the rolls 339, the pressure rolls being carried on upright arms 342 secured on the axle 337, while extensions of said arms are pulled upon by springs 343 to maintain adequate pressure between the several disks and glue roll.

The glue feed roller and disks may be driven in harmony with the travel of the paper in any suitable manner, for example by a sprocket wheel 344 mounted on the shaft of the gear 313, with suitable intermediate gearing to deliver the proper speed. A sprocket chain 345 communicates the drive from the sprocket 344 to a sprocket 346 on the shaft of the glue feed roll 335.

The wet belt presser 350 operates preferably during a pause in the travel of the book and comprises an endless belt of rubber or the like traveling intermittently through and above water and operated to be lifted bodily to press its upper portion toward the entire back of the book so as to exert a strong even pressure over all parts of the back thereby forcing the backlining paper into intimate contact with the headband and supers previously applied to the book. The wetness of this belt tends to soften the paper and promote its intimate pressing into place, and it also prevents the belt adhering to any accidentally exposed portions of adhesive, while any adhesive received on the belt is removed in its travel through the water before it can be applied to another book.

The mechanism is shown in Figs. 19, 20 and 21 as mounted on a pair of standards 351 each having a pair of outwardly extending lower lugs 352 and upper lugs 353. The water tank 354 is provided with downstanding stems 355 sliding in the respective lugs 353 and 352. A cross bar 356 is slidable on the two stems and itself is movable upwardly and downwardly in timed relation to the movements of the book, being lifted and then dropped during each pause of book travel. For the purpose of such timed operation the cross bar is shown connected by a link 357 with a cam lever 358 fulcrumed on the standards, this lever beyond its fulcrum carrying a cam roll engaging a cam 359 on the main shaft 44. As the cam is positioned in Fig. 19 the water tank is in its lowered position but it will be lifted and dropped during a fraction of the complete cycle comprised in a single rotation of the main shaft, namely during the pause in book travel.

The connections by which the cross bar 356 lifts and lowers the water tank are resilient, and may comprise lugs 361 on the sides of the tank, these having secured in them vertical rods 362 extending downwardly and through apertures at the end of the cross bar 356. Each rod has a head 363 below the bar, and above the bar is surrounded by a spring 364 confined by a collar 365. The tank therefore is supported upon the springs, with its weight borne by the cross bar, the arrangement being such that when the tank is lifted for the pressing operation the springs 364 may yield to cushion the action and prevent breakage while maintaining a moderate resilient pressure against the book.

The belt 366, which may be an endless sheet or apron of rubber treated fabric, is shown passing around two submerged rollers 367, mounted by means of arms 368, and upper rollers 370. Fig. 19 shows the water tank and presser in normal position in full lines, and in raised position in dotted lines, in which latter position the belt will be seen to have engaged the book and adapted itself to the curved contour so as to exert the desired pressure. The belt is arranged to be advanced substantially along the guiding rollers during the drop movements following each operation so as to bring a freshly wetted surface for the succeeding operation. This may be effected by rotation of one of the upper guide rollers 370, for example the one shown at the left in Fig. 19, which is also shown in the reverse view in Fig. 21 on an enlarged scale. A gear 371 is shown turning on the same shaft with the roller 370. A pawl and ratchet device 372 of the roller pawl type is indicated in dotted lines as interposed between the guide roller and the gear, this comprising a cylindrical roller or spheres spring pressed into wedging engagement in a recess between portions of the gear and roller. By this arrangement the rotation of the gear in one direction is without effect, but in the other direction causes the drive of the roller. The gear is shown as being oscillated by engagement with a rack 374 which, while relatively movable, is preferably stationary, being extended and connected between the lower clamp guide rail 30 and one of the upper standard lugs 353. By this arrangement, with each upward lifting movement of the tank, the gear 371 will roll along the rack 374, thus advancing a substantial section of the wet belt and bringing a clean wet surface beneath the book, while on the return or downward movement of the tank and gear there will be no reverse movement of the belt. The up movement is limited by stop bar 375 on the gear which contacts against the rack as the teeth reach the end of their engagement.

While the arrangement thus far described would give an effective wet pressing action upon a slightly concaved book back, it might not reach to the corners of a decidedly curved back, and it is therefore preferred to employ an auxiliary means to deflect and press the belt snugly around the entire back surface. Thus there is shown mounted on the water tank, between the upper main rollers 370, an inner auxiliary roller 376 mounted on a block 377 and an outer auxiliary roller 379 mounted on a similar block 380. The outer roller is adjustable to suit different widths of book back. When the water tank rises the upper stretch of the wet belt is depressed by the book between the auxiliary rollers, which are nearer together than the main rollers, thus giving a more extensive contact around the convex curve.

The second pressing operation is of a different sort, performed by what has been termed the V-roll presser 400, arranged following the wet belt presser. It comprises a roller having a groove with inclined sides, and it operates progressively along the length of the book as the book travels from one position to another, whereas the wet belt presser operates simultaneously upon all parts of the book back for pressing and fixing the backlining and other components in position in advance of the progressive actions of the subsequent pressers.

The V-roll presser is shown in Figs. 22 to 24. A standard 401 carries a bracket 402 on which is supported a water tank 403, it being preferred that this presser operates in a wet condition. The V-roll 404 is shown having its axle 405 mounted on a pair of opposite swinging arms 406 which are pulled by springs 407 to press the V-roll forcibly against the book, while permitting it to yield slightly as the book initially comes into engagement with the roll. The roll might revolve directly in the water of the tank, but herein it is shown as supplied with water through a wetting or water feed roll 408 having a proper contour to carry the water to all parts of the V-roll. The V-roll 404 may be composed of various materials. It comprises a central piece or disk 410 which may be composed of rubber or metal, and separate end pieces or bevelled disks 411, which may be composed of soft rubber, or in some cases of compressed felt. The V-roll is adjustable to books of different thickness by replacing or supplementing the center disk 410 by a disk of other thickness so as to change the spacing of the bevelled disks, which themselves may be interchanged for others of differing angle for book backs of differing convexity. An alternative arrangement is to enlarge the V-roll 404 so that its rim, or the edge thereof, runs directly in the water, thus simplifying the structure and adjustment for size.

The operation of the V-roll will be understood from Fig. 22 which shows the relation of the contour of the roll to that of the book back. By this arrangement the pressure of the roll is concentrated or applied more especially at or along the outer edges or corners of the back, so as to press the side edges of the paper lining intimately into place, which could not be so effectively done by the wet belt presser.

The third pressing operation, performed by the cushion roll presser 415, is shown in Figs. 25, 26 and 27 and is supplementary to the others, being intended to deliver a more forcible surface pressure over the area of the book back than can be delivered with either the welt belt presser or the V-roll presser. The cushion roll presser is preferably pneumatic or hydraulic so as to afford in effect a powerful fluid pressure at every point of contact. It is intended that the book shall roll along above the pneumatic roller, which shapes itself against the book so as progressively and uniformly to force the paper lining into place from side to side and from end to end. This presser might in some cases precede the V-roll presser but operates to better advantage following the V-roll, which in turn follows the wet belt presser, which delivers a simultaneous preliminary pressure to ensure the adhering of the lining against any possible displacement. There is therefore an operative co-action in the different pressers and in the order in which they are arranged.

As shown in Figs. 25 and 26 the cushion roll presser is mounted on a standard 416 carrying near its upper part a bracket 417 on which is supported a water vessel 418. The cushion roll 420 may be an inflatable roll with its periphery composed for example of rubber. This normally may take a cylindrical shape as indicated by dotted lines in Fig. 27, but when blown up it may assume the shape of a bulging barrel as indicated. The cushion roll therefore comprises the cylindrical rubber portion 421, at the ends of which are inner and outer clamping disks 422 and 423 by which the edges of the cylinder are held, these disks in turn being mounted on the hollow shaft 424 and all these mountings sealed in an air tight manner. An inflating valve 425 is shown which may resemble an ordinary bicycle valve.

The cushion roll is preferably mounted to remain constantly in operative position, that is at or above the level of the advancing book B. It will be understood that the cushion periphery of the roll yields and becomes depressed as indicated in Figs. 25 and 27 when pressed by the book, and the roll may be mounted to yield bodily as follows. The hollow shaft 424 is mounted upon an axle 427 which is supported at the upper ends of a pair of swinging arms 428 fulcrumed at 429 in the bracket 417. A strong spring 430 holds the roller in normal position, but permits a slight yielding as described while ensuring a high pressure of the roll against the book.

The roll may be maintained wetted by contact with a water feed roll 432 which may be shaped substantially to conform to the contour of the cushion roll, this feed roll mounted on a shaft 433 journalled in the walls of the tank. The water feed roll may be constantly driven to keep both rolls wet and clean, and for this purpose it is shown coupled to the shaft of a pulley 434 driven by a belt 435 from a pulley 436 which may be attached to the shaft of a sprocket wheel 437 driven by a chain 438 from a sprocket wheel 439 turned by a counter shaft 440 receiving its motion from the main shaft 44 in any suitable manner.

Following the cushion roll presser 415 may advantageously be provided another or other pressers such as the presser 400ª of the V-roll type, useful for the purpose of finally pressing in place and compacting the extreme edges of the paper lining at the corners of the book back. The complete described sequence of the four pressers gives a very advantageous cooperation and a very firm consolidation of the book and the backlining components, resulting in a uniformly perfect product.

It will be noted that the four described pressers follow in sequence after the headbander and the paper lining applier along the second or front stretch of the clamp train path or orbit. These mechanisms are spaced as closely together as they conveniently can be so as to leave a substantial extent of travel of each book beyond the final presser. Thus, after all the lining pressing operations have been completed the glued, wetted and pressed components are given a reasonable opportunity to set or harden during their travel along the remainder of the front stretch, and around the second end of the machine, so as to minimize accidental loosening or injury prior to or during the discharge and delivery or outfeed.

The delivery mechanism 450 is arranged immediately preceding the infeed point on the first stretch of clamp travel, and is shown in Figs. 28 and 29. It operates to receive each backlined book as the clamp opens for discharge at the delivery point, and to handle it in an advantageous manner for outfeed to a suitable stacking or other place. Preferably the delivery mechanism comprises a device in the nature of an arm and hand which takes each book at the release point and lets it gently down a curved discharge chute to the outfeeding belt.

The delivery mechanism is supported on a pair of heavy standards 451 partly attached to the base 28 and a pair of independent standards 452 spaced considerably outwards of the others. Extending from the inner to the outer standards are a wide table 454 and a narrow table 455 spaced somewhat apart to receive between them the outfeeding delivery belt 456. It will be understood that these parts are much longer than appears in Fig. 28 wherein the middle portion is omitted for condensation. The books may be received one following the other on the outwardly traveling belt, the books to be shifted from the belt to the table or elsewhere before reaching the outer end of the belt, unless arranged for the belt to deliver into a stacking device or elsewhere.

The conveying belt 456 of the delivery is shown as an endless belt rotating upon inner pulleys 457 and outer pulleys 458, the latter supported on brackets 459. The belt may be constantly driven at a relatively slow speed, sufficient however to permit the successive books to be received and follow each other in procession, without overlapping or contacting each other, which might cause injury to the lined backs. For driving the belt there is shown a sprocket wheel 461 on the shaft of the pulleys 457, this sprocket engaged by a chain 462 passing around idler sprockets 463 and around a drive sprocket 464 on the main shaft 44.

Fig. 28 shows the clamp 31 is being open but indicates the book still in its clamped position about to drop from the clamp to the delivery mechanism. In order to guide and divert the book in a smooth path from its upright position to its flatwise position on the conveyor belt or apron there is shown a curved guide plate 466 extending from a point inwards of the clamp to a point closely above the belt. This alone would be disadvantageous since the book on release would drop abruptly from the clamp, with possibly injury on striking the guide plate, scraping along the plate and with acceleration and perhaps impact with another book on reaching the belt; and the following mechanism has been devised, in the nature of an arm and hand, which receives the back of the book at the point of discharge from the clamp and lets the book down easily and gently around the curved guide plate until deposited without impact or injury upon the outfeeding belt.

A swinging arm 468 supports at its inner extremity a cupped carrier 469 adapted to receive the rounded back of the book and support it as would the palm of a person's hand. The normal position may be as shown in Fig. 28 or slightly higher, but low enough to ensure clearance of the approaching book. When the clamp opens the book is received and supported on the hand or carrier and let down by the swing of the arm as described. To effect these motions the arm is shown fulcrumed at 470 upon a movable carriage 471. In other words the arm has a floating fulcrum. The carriage 471 is shown as a vertical bar mounted for up and down motion by means of a pair of links 472, 473, which links are preferably parallel to give a parallel motion to the bar or carriage. The link 472 is fulcrumed upon a top bracket 474 by a stud or fulcrum 475 while the lower link 473 is fulcrumed at 476 on the same bracket. The link 473 has an inward extension 477 by which the link mechanism can be periodically swung in time with the book discharging operation, as will be described.

In order to control the path of the downward movement of the carrier 469 to conform generally with the curved guide plate 466 the following additional linkage may be employed. The swinging arm 468 is shown as having an outward extension 479 which is connected by an adjustable link 480 to a fixed pivot point 481 on the top bracket 474. The result of this arrangement is that when the lever extension 477 is swung upwardly and the carriage 471 thrown downwardly, the link 480 will cause the upswinging of the extension 479 and thereby the downswinging of the arm 468 and the carrier or receiver 469, namely along a curved path nearly parallel with but somewhat diverging from the curved plate 466.

After the arm and carrier have let the book down nearly to the end of the guide plate it is necessary that they shall release the book so that they may return to raised position, while the book passes on down to the outfeeding belt. For this purpose it is arranged to disengage the book from the receiver before the arm reaches the end of its downward movement so that the book will drop slightly to the guide plate and the arm can return to initial position without interference. For this purpose the carriage 471 is shown formed with a downward extension 482 at the foot of which are a pair of stop fingers 483. When the carriage descends these come in the path of the descending book and stop its descent, while the carrier 469, by reason of holes 484, receiving the fingers 483, may swing further down, out of engagement with the book, thus releasing the latter upon the plate.

The actuation of these parts may be effected by the following connections. The inner end of the lever 477 is connected by a link 485 with an axle 486 mounted at the top of a sliding rod 487. This rod slides in a fixed frame part 488, below which the rod is surrounded by a spring 489 bearing downwardly on a collar 490 to hold the rod in its normal or lowered position. The rod passes also through bearings 491 and 492 below which it is yoked at 493 to carry a cam roll 494 bearing upon a cam 495 on the main shaft 44, this cam being timed to lift the rod and so operate the arm and carrier mechanism at the proper point in the cycle of operations with relation to the release of each book by its clamp.

There have thus been described a method or system and an apparatus for the manufacture of books relating specifically to the headbanding and backlining operations respectively, embodying the principles and attaining the objects of the present invention. Since many matters of operation, combination, arrangement, construction and detail may be variously modified without departing from the essential principles it is not intended to limit the invention to such matters except so far as set forth in the appended claims.

What is claimed is:

1. The method of backlining and headbanding a round-back book comprising shaping the book and holding it so during the succeeding steps, applying adhesive to the rounded back of the clamped book, applying a super to the rounded back shorter than the back, applying headbands to the adhesive covered ends of the back, applying adhesive to the ends of a paper lining and subsequently applying and pressing it into place upon the rounded back, with its adhesive covered ends overlapping the headbands.

2. The method of backlining and headbanding a round-back book comprising applying glue reaching to the ends of the book back, applying a super not reaching to the ends, applying headbands at the glued ends, applying a paper lining and pressing it into place overlapping the headbands, and applying glue to the ends of the lining before applying the lining.

3. In a machine for backlining round back books, the combination with a traveling carrier comprising clamps for holding and advancing each book, means for infeeding the books into the clamps, a leveling plate upon which each infed book rests before its clamp closes, means for closing each clamp on its book, and a device associated with said plate for shaping each book before being clamped, the same provided with shaping parts acting upon the rounded and backed book as it advances in the clamp before the closing of the latter.

4. In a backlining machine for round back books, means for advancing the books, a reshaping means for comprising a back plate along which the book back advances and opposite fixed shaping members adjacent thereto at each side of the book path for gradually shaping the book back as it advances.

5. In a machine of the clamp train type for applying the backlining component to round book backs, means following the backlining devices for opening each clamp at the discharge point, combined with delivery mechanism comprising a concave receiver for the rounded book back, means to lift the receiver to the discharge point to receive each book without shock and to lower the receiver to let down each book, a curved guide for the lowering book, and an outfeeding conveyor receiving each book from the receiver.

6. In a machine for backlining and headbanding round-back books having means for advancing a succession of books endwise with their backs downward and means for successively applying glue, headbands and back lining, a headbanding mechanism comprising means for supplying a double edge headband strip, means for slitting it during advance, means for conducting the two single headband strips beneath the ends of each book in headbanding position in unglued condition, and means for severing therefrom and elevating headbands to the glued back of the book.

7. In a machine for backlining and headbanding round-back books having means for advancing a succession of books endwise with their backs downward and means for successively applying glue, headbands and back lining, a headbanding mechanism comprising means for conducting two headband strips beneath the ends of each book in headbanding position in unglued condition, and means for severing headbands therefrom, a holder arranged centrally of the book position at each end to receive the headbands, a shaper movable relatively to the holder and conformable to the rounded book back, and means for lifting the holder and shaper to the glued book back, with a yielding connection whereby the holder may be stopped by the book to hold the headband while the shaper continues and presses the headband to position.

8. The method of backlining and headbanding round-back books comprising applying glue to the rounded backs, and applying unglued headbands upon the glued ends of the backs, and applying paper linings to the glued and headbanded backs after first applying a stripe of glue to the ends of the lining which are to overlap the headbands.

9. In a machine of the clamp train type for applying the backlining component to round book backs, means following the backlining devices for opening each clamp at the discharge point, combined with delivery mechanism comprising a concave receiver for the rounded book back, means to lift the receiver to the discharge point to receive each book without shock and to lower the receiver to let down each book, a curved guide for the lowering book, and an outfeeding conveyor receiving each book from the receiver; said guide having a shape diverging from the path of the receiver, whereby the receiver will clear the book as the book passes from the guide to the conveyor.

10. A machine as in claim 9 and wherein is a finger device for disengaging each lowered book from the cupped receiver.

11. The method of backlining and headbanding round-back books comprising performing the following operations in prompt succession, namely, shaping the book to its round back form and thereafter maintaining it in such form, applying adhesive extending to the ends of the rounded back, applying a super shorter than the length of the back, applying adhesive not extending to the ends of the back, applying headbands to the ends over the partly set first coat of adhesive, applying a strip of adhesive to the ends of a paper lining and applying such lining to the headbanded back with the adhesive stripes overlapping the headbands, wetly pressing the entire length of paper lining, and progressively pressing the lining from end to end forcibly into place.

12. The method of backlining and headbanding round-back books comprising performing the following operations in prompt succession, namely, applying adhesive extending to the ends of the rounded book back, applying one or more supers shorter than the back, applying further adhesive not extending to the ends of the back, applying headbands to the ends over the partly set first coat of adhesive, applying a stripe of adhesive to the ends of a paper lining and applying such lining to the headbanded back to overlap the headbands, and pressing the lining forcibly into place.

13. The method of backlining and headbanding round-back books comprising performing the following operations in prompt succession, namely, applying adhesive extending to the ends of the rounded back, applying one or more supers shorter than the back, applying headbands to the adhesive covered ends, applying a stripe of adhesive to the ends of a paper lining and applying such lining to the headbanded back to overlap the headbands, and pressing the paper lining into place.

14. The method of backlining and headbanding round-back books comprising performing the following operations in prompt succession, namely, applying adhesive extending to the ends of the rounded back, applying headbands to the adhesive covered ends, and applying a stripe of adhesive to the ends of a paper lining and applying such lining to the headbanded back to overlap the headbands.

15. The method of backlining and headbanding round-back books comprising performing the following operations in prompt succession, namely, applying adhesive extending to the ends of the rounded back of the book, applying unglued headbands to the glued ends of the back, applying glue to the ends of the inner side of a paper lining, applying such paper lining to the book back with its glued ends overlapping the headbands, wetly pressing the lining over its entire length, and progressively pressing the lining from end to end.

16. A method for applying the headbanding and backlining components to a book, comprising applying glue to the book back, then applying a dry headband to one or both ends of the glued back, and then applying glue to one or both ends of a lining piece and applying it upon the headbanded book back, with the glued ends overlapping the headbands.

In testimony whereof, I have affixed my signature hereto.

ALFRED BREDENBERG.